(12) United States Patent
Lu et al.

(10) Patent No.: US 9,667,420 B2
(45) Date of Patent: *May 30, 2017

(54) METHOD FOR RAPIDLY GENERATING COORDINATE POINT IN EMBEDDED SYSTEM

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/423,506

(22) PCT Filed: Oct. 22, 2013

(86) PCT No.: PCT/CN2013/085692
§ 371 (c)(1),
(2) Date: Feb. 24, 2015

(87) PCT Pub. No.: WO2014/067410
PCT Pub. Date: May 8, 2014

(65) Prior Publication Data
US 2015/0349955 A1    Dec. 3, 2015

(30) Foreign Application Priority Data

Oct. 31, 2012  (CN) .......................... 2012 1 0428772

(51) Int. Cl.
*H04L 9/00*   (2006.01)
*H04L 9/08*   (2006.01)
(Continued)

(52) U.S. Cl.
CPC ............ *H04L 9/0872* (2013.01); *G06F 21/64* (2013.01); *H04L 9/0816* (2013.01);
(Continued)

(58) Field of Classification Search
CPC ... G06F 17/5018; G06F 21/64; H04L 9/3066; H04L 9/0816; H04L 9/0872; H04L 63/123; H04L 29/06; H04L 2209/24
(Continued)

(56) References Cited

U.S. PATENT DOCUMENTS 7,231,329 B1    6/2007 Kaul

*Primary Examiner* — Brian Shaw
(74) *Attorney, Agent, or Firm* — Hammer & Associates, P.C.

(57) ABSTRACT

A method for rapidly generating coordinate points in an embedded system, comprising: according to a preset segment number of segmentation and a preset step size, segmenting a numerical value to be calculated and then grouping each data segment, and calculating an initial point value corresponding to each digit in a group of data of each data segment; detecting the value of each digit in the current data group of all data segments, subjecting the initial point value corresponding to the digit with a value of 1 and an intermediate point value to point addition operation, and updating the intermediate point value using the point addition operation result; judging whether a next data group of each data segment exists, if it does not exist, taking the intermediate point value as a resulting coordinate point value and storing same, and ending; and if it exists, subjecting the intermediate point value to a point doubling operation for a preset step size frequency, and updating the intermediate point value using the point doubling operation result, taking a next data group of each data segment as a new current data group, and continuing to perform a point addition and point doubling operation. The present invention can rapidly generate coordinate points, is effectively applied to the genera- (Continued)

tion of key pairs and signatures, and greatly improves the operation speed.

15 Claims, 9 Drawing Sheets

(51) Int. Cl.
    *G06F 21/64*     (2013.01)
    *H04L 9/30*     (2006.01)
    *H04L 29/06*     (2006.01)

(52) U.S. Cl.
    CPC .......... *H04L 9/3066* (2013.01); *H04L 63/123* (2013.01); *H04L 2209/24* (2013.01)

(58) Field of Classification Search
    USPC .................................................. 380/44; 703/2
    See application file for complete search history.

METHOD FOR RAPIDLY GENERATING COORDINATE POINT IN EMBEDDED SYSTEM

TECHNICAL FIELD

The present invention relates to the cryptology field, more particularly to a method for quickly generating coordinate points in an embedded system.

PRIOR ART

With the development of science and technology, the requirement of data security becomes higher and higher. Protecting data safely in the prior art can be implemented by ways such as encryption and signature, etc. However, a key is required to participate in a process of encryption and signing, the data volume in the process of generating key is large, and the speed of operation is slow, which makes implementing encryption and signature inefficient.

SUMMARY OF THE INVENTION

The object of the present invention is to provide a method for quickly generating coordinate points in an embedded system, which can applied in generating key pairs and signature effectively, so as to improve operation speed greatly.

Thus, there is provided a method for quickly generating coordinate points in an embedded system, which comprises:

Step S1, segmenting a numerical value which is to be calculated according to a preset segment splitting number (i.e. the number of split segments) and calculating data bit length of each data segment;

Step S2, dividing each data segment into sets according to a preset step length; calculating an original point value corresponding to each bit in a set of data of each data segment according to a base point, data bit length of each data segment and the preset step length; and taking the first set of data of each data segment as a current data set;

Step S3, checking whether the data in the current data set of each data segment is 0, if yes, going to Step S4; otherwise, going to Step S5;

Step S4, taking a next data set of each data segment as the current data set and going back to Step S3;

Step S5, checking value of each bit in the current data set of a current data segment, performing point add operation on an original point value corresponding to a bit of which the value is 1 and a mid-point value and updating the mid-point value with the result of the point add operation;

Step S6, determining whether the current data sets of all data segment is processed completely, if yes, going to Step S8; otherwise, going to Step S7;

Step S7, taking other unprocessed data segments as new current data segments and going back to Step S5;

Step S8, determining whether a next data set of each data segment exists, if yes, going to Step S9; otherwise, taking the mid-point value as a result coordinate point for storage and ending operation;

Step S9, performing point double operation on the mid-point value for a number of times of the preset step length, updating the mid-point value with result of the point double operation and taking a next data set of each data segment as a new current data set; and Step S10, checking whether data in the current data set of each data segment is 0; if yes, going to Step S8; otherwise, going back to Step S5.

Preferably, before Step S1, the method comprises

Step S0, determining whether the data bit length of the value which is to be calculated is integral multiple of product of the preset segment splitting number and the preset step length, if yes, go to Step S1; otherwise, padding 0 before the value to be calculated and going back to Step S0.

Preferably, before Step S0, the method comprises

Step a1, generating or obtaining a random number; and

Step a2, performing modular operation on the random number with a first fixed value so as to obtain a reminder and determining whether the reminder is 0, if yes, outputting error prompting information and going back to Step a1; otherwise, converting the random number into a binary number so as to obtain the value to be calculated.

Preferably, in Step S2, calculating an original point value corresponding to each bit in a set of data of each data segment according to the base point, data bit length of each data segment and the preset step length specifically comprises that Step S21 to Step S25 is process of calculating an initial point value corresponding to the most significant bit in a data set of all data segments; Step S26 to Step S28 is process of calculating original point values corresponding to other bits except for the most significant bit in a data set of each data segment;

Step S21, numbering split data segments in order from small to big according to the sequence from low bit to high bit; taking the base point as the original point value corresponding to the most significant bit in a set of data set of the data segment with the minimum number; taking the data segment with the minimum number as a current data segment;

Step S22, performing point double operation on the original point value corresponding to the most significant bit in a set of data set of the current data segment; a first counting number adding 1 to itself; the initial value of the first counting number is 0 and the initial value of a mid-value is 0;

Step S23, determining whether the first counting number is greater than the data bit length of each data segment, if yes, going to Step S25; otherwise, going to Step S24;

Step S24, updating the mid-value with the result of the point double operation; performing point double operation on the mid-value; the first counting number adding 1 to itself and going back to Step S23;

Step S25, determining whether the original point value corresponding the most significant bit in a data set of all the data segments is calculated completely, if yes, going to Step S26; otherwise, taking a next data segment as new current data segment and taking the result of the point double operation as the initial point value corresponding to the most significant bit in a data set of the current data segment, going back to Step S22;

Step S26, taking the most significant bit in a data set of the current data segment as a current bit; the initial value of a second counting number is 0;

Step S27, performing point double operation on the initial value corresponding to the current bit; the second counting number adding 1 to itself; determining whether the second count number is greater than a preset step length, if yes, going to Step S29; otherwise going to Step S28;

Step S28, taking a next bit as a new current bit and performing result of the point double operation as the original point value corresponding to the new current bit; going back to Step S27; and Step S29, determining whether computing of the initial point value corresponding to each bit in a data set of all data segments has been completed, if yes, going to Step S3;

otherwise, taking a next data segment as the current data segment and going back to Step S26.

Preferably, between Step S3 and Step S5, the method comprises Step A1;

Step A1, searching for a corresponding initial point value in an initial value list according to combination of current data set of all data segments, if the initial point value is found, obtaining the corresponding initial point value and performing point add operation on the initial point value and the mid-point value, updating the mid-point value with result of the point add operation and going to Step S8; if the initial point value is not found, going to Step S5;

between Step S6 and Step S8, the method comprises taking the result of point add operation as the initial point value and correspondingly storing the initial point value and the combination of current data sets of all data segments in the initial value list;

if the result for determination of Step S10 is no, going back to Step A1.

Preferably, searching for a corresponding initial point value in an initial value list according to a combination of current data set of all data segments specifically comprises combining current data set of each data segment according to the numbers from big to small so as to obtain a binary data string; searching for corresponding initial point value in the initial value list according to the binary data string.

Preferably, searching corresponding initial point value in the initial value list according to the binary data string specifically comprises converting the binary data string into decimal data and searching for the corresponding initial point value in the initial value list according to the sequence number.

In another aspect, there is provided a method for quickly generating coordinate points in an embedded system, comprising:

Step s1, calculating number of initial point values to be calculated according to a preset segment splitting number and a preset step length;

Step s2, calculating an initial point value corresponding to the most significant bit of each data segment respectively according to a base point and the preset segment splitting number; taking the most significant bit of each data segment as a current bit;

Step s3, performing point double operation on the original point value of the current bit of respective data segments so as to obtain an original point value of a current adjacent low bit for storage; a first count value adding 1 to itself;

Step s4, determining whether the first count number value overpasses value of the preset step length, if yes, going to Step s4; otherwise, taking the adjacent low bit as a new current bit, going back to Step s3;

Step s5, building a binary data string according to the preset segment splitting number and the preset step length;

Step s6, setting respective data bits of the binary data string as 0 or 1 so as to obtain a current binary data string;

Step s7, checking respective data bits in the current binary data string respectively, performing point add operation on the corresponding original point value in corresponding data segment of the data bit of which the value is 1 so as to obtain the initial point value; storing the initial point value and the current binary data string in one-one corresponding way to form a initial value list; a second counting number value adding 1 to itself;

Step s8, determining whether the second counting number value is greater than the number of the initial point values; if yes, going to Step s9; otherwise, going back to Step s6;

Step s9, dividing the number value to be calculated into segments according to the preset segment splitting number; dividing each data segment into sets according to the preset step length and taking a first set of data of each data segment as a current data set;

Step s10, checking whether the data in the current data set in each data segment is 0, if yes, going to Step s11; otherwise, going to Step s12;

Step s11, taking a next data set of each data segment as the current data set and going back to Step S10;

Step s12, taking a corresponding initial point value as a mid-point value from the initial value list according to combination of the current data set of each data segment; determining whether a next data set of each respective data segment exists, if yes, going to Step s13; otherwise, taking the obtained initial point value as a result coordinate point value for storage; ending operation;

Step s13, performing point double operation on the mid-point value for a number of times of the preset step length, updating the mid-point value with the result of the point double operation and taking a next data set of each data segment as a new current data set;

Step s14, checking whether data in the current data set of each data segment is 0, if yes, going to Step s16; otherwise, going to Step s15;

Step s15, obtaining corresponding initial point value from the initial value list according to combination of the current data set of all data segments; performing point add operation on the mid-point value and the obtained corresponding initial point; updating the mid-point value with the result of the point add operation and going to Step s16; and Step s16, determining whether a next data set of each data segment exists, if yes, going back to Step s13; otherwise, taking the mid-point value as the coordinate point value for storage; ending operation.

Preferably, Step s1 specifically comprises taking result of subtracting 1 from product of the preset segment splitting number and the preset step length as number of initial point values.

Preferably, Step s5 specifically comprises converting the product of the preset segment splitting number and the preset step length into a binary data so as to obtain the binary data string.

Preferably, before Step s9 the method comprises

Step s9', determining whether the data bit length of the value to be calculated is integral multiple of the product of the preset segment splitting number and the preset step length; if yes, going to Step s9; otherwise, padding 0 before the value to be calculated and going back to Step s9'.

Preferably, before the Step s9', the method comprises

Step a1, generating or obtaining a random number; and

Step a2, performing modular operation on the random number with a first fixed value so as to obtain a reminder and determining whether the reminder is 0, if yes, outputting error prompting information and going back to Step a1; otherwise converting the random number into a binary data so as to obtain the value to be calculated.

Preferably, in Step s7, storing the initial point value and the current binary data string in one-one corresponding way to form a initial value list specifically comprises converting the current binary data string into decimal data so as to obtain the sequence number and storing the initial point value and corresponding sequence number as the initial value list; and in Step s15, obtaining corresponding initial point value from the initial value list according to combination of the current data set of each data segment specifically comprises calculating the sequence number according to the current data sets of all data segments and obtaining the corresponding initial point value from the initial value list according to the sequence number.

Preferably, calculating the sequence number according to the current data seta of all data segments specifically comprises combining the current data sets of all data segments orderly and converting the combined binary data into decimal data so as to obtain the sequence number.

Preferably, in Step s2, calculating original point value of the most significant bit of each data segment respectively according to the base point and the preset segment splitting number specifically comprises Step s21, numbering each split data segment in order from small to big according to the sequence from low bit to high bit; taking the base point as the original point value corresponding to the most significant bit in a set of data set of the data segment with the minimum number; taking the data segment with the minimum number as a current data segment;

Step s22, performing point double operation on the original point value corresponding to the most significant bit in a set of data set of the current data segment; a first counting number adding 1 to itself; the initial value of the first counting number is 0 and the initial value of a mid-value is 0;

Step s23, determining whether the first counting number is greater than the data bit length of each data segment, if yes, going to Step s25; otherwise, going to Step s24;

Step s24, updating the mid-value with the result of the point double operation; performing point double operation on the mid-value; the first counting number adding 1 to itself and going back to Step s23; and Step S25, determining whether computing the original point value corresponding the most significant bit in a data set of all the data segments has completed, if yes, going to Step s26; otherwise, taking a next data segment as a new current data segment and taking the result of point double operation as the initial point value corresponding to the most significant bit in a data set of the current data segment, going back to Step s22.

Compared with the prior art, the present invention has following advantages:

by adapting a fixed point multiple algorithm, embodiments of the present invention can quickly generate coordinate points for applying to generation of key pairs and signature, which greatly increases operation speed.

BRIEF DESCRIPTION OF THE ACCOMPANYING DRAWINGS

DETAILED DESCRIPTION OF THE PRESENT INVENTION

Embodiments of the invention will be described clearly and completely in conjunction with the accompanying drawings as follows. The described embodiments are merely a part of, but not all of, the embodiments. Based on the described embodiments, other embodiments obtained by those of ordinary skill in the art without any creative work also belong to the scope of the disclosure.

Embodiment 1

Figure 1:
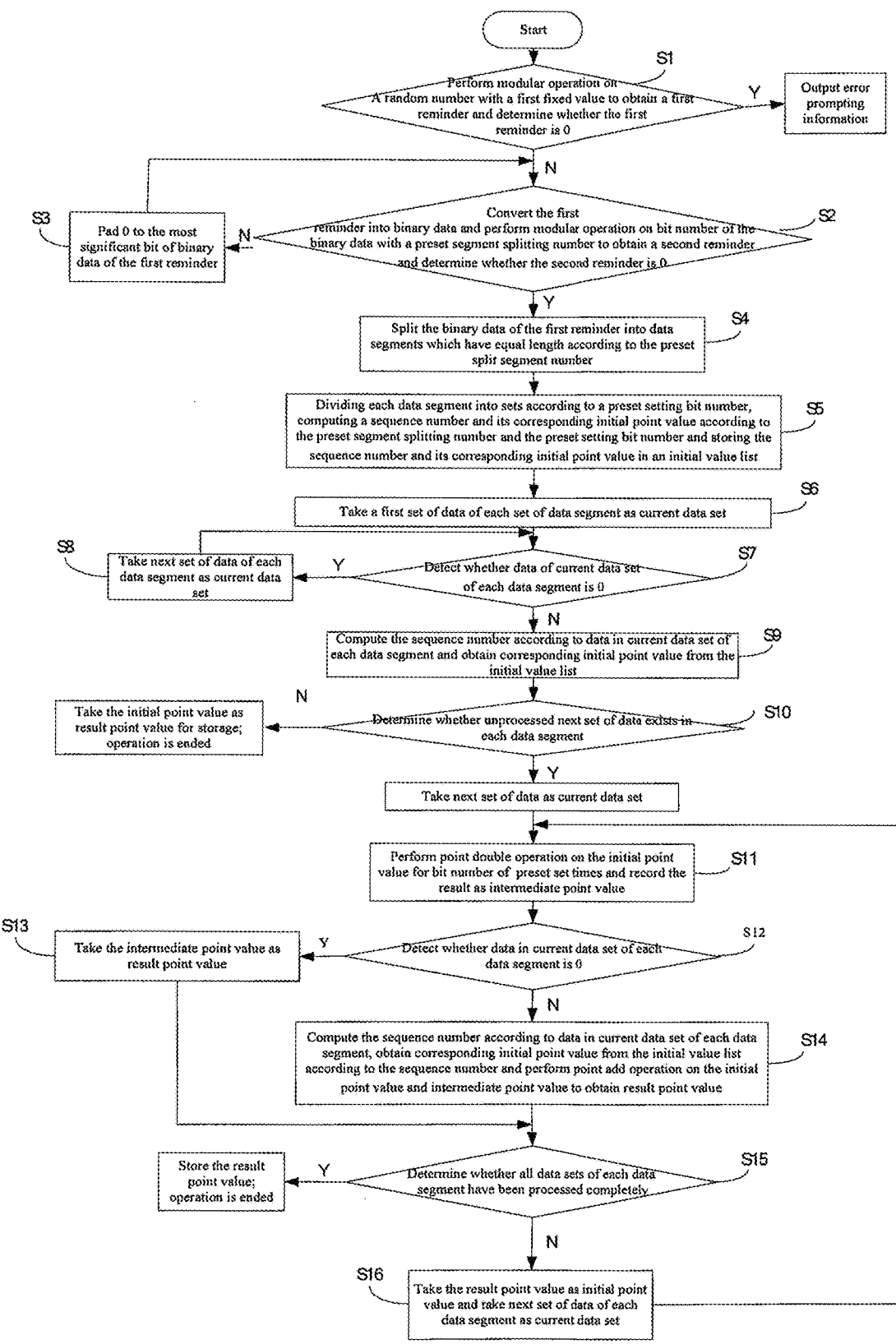
FIG. 1 is a flow chart of a method for quickly generating coordinate points in an embedded system provided by embodiment 1 of the present invention.

Embodiment 1 of the present invention provides a method for quickly generating coordinate points in an embedded system which predefines an elliptic curve and can be implemented by, when hardware source is sufficient, splitting a generated random number into a plurality of segments in a prime number domain. For example, the random number is split into 3 segments. Sequence numbers and corresponding initial values are pre-calculated in embodiment 1. Referring to FIG. 1, the method of the present embodiment comprises:

Step S1, performing modular operation on the random number with a first fixed value so as to obtain a first reminder, and determining whether the first reminder is 0, if yes, outputting error information; otherwise, going to Step S2.

In embodiment 1, if the first reminder is 0, random numbers can be generated for many times; before Step S1, the method includes generating the random number and obtaining a first fixed value; in Step S1, if the determination is no, the method further comprises generating a random number and going to Step S1.

Step S2, converting the first reminder into a binary number, obtaining a second reminder by performing modular operation on the bit number of the binary number with a preset segment splitting number and determining whether the second reminder is 0, if yes, going to Step S4; otherwise, going to Step S3.

In embodiment 2, for example, the first reminder is 372, converting the first reminder into binary data 101110100 with 9 bits correspondingly; if the preset segment splitting number is 3; performing modular operation on 9 with 3 so as to obtain the second reminder which is 0.

Step S3, padding 0 to the most significant bit of the binary data of the first reminder, and going back to Step S2.

In embodiment 1, if the preset segment splitting number is 4 and the first reminder is 372, the first reminder is converting into binary data with 9 bits; performing modular operation on 9 with 4 so as to obtain a second reminder 1; padding 000 before 101110100 so as to obtain binary data 000101110100 with 12 bits; performing modular operation on 12 with 4 so as to obtain the second reminder which is 0.

Step S4, splitting the binary data of the first reminder into data segments which have equal length according to the preset segment splitting number.

In embodiment 1, split 101110100 into 3 segments as 101, 110, and 100.

Step S5, splitting each data segment into sets according to the preset step length, calculating a sequence number and its corresponding initial point value according to the preset segment splitting number and the preset step length and storing the sequence number and the corresponding initial point value in an initial value list.

In embodiment 1, numbering each data segment from 0 according to sequence from low bit to high bit; detailed process of calculating the sequence number includes orderly combining data in the current data set of the data segment with maximum number and the data in the current data set of the data segment numbered 0 so as to obtain new binary data; and converting the new binary data into decimal data so as to obtain the sequence number.

For example, if the maximum number is 2, the preset step length is 3; the data in the current data set numbered 2 is 101; the data in the current data set numbered 1 is 110; the data in the current data set numbered 0 is 100; thus the newly combined binary data is 101110100 and corresponding sequence number is 372.

For example, if the maximum number is 2, the preset step length is 1; the data in the current data set numbered 2 is 1; the data in the current data set numbered 1 is 1; the data in the current data set numbered 0 is 0; thus the newly combined binary data is 110 and its corresponding sequence number is 6.

Figure 2:
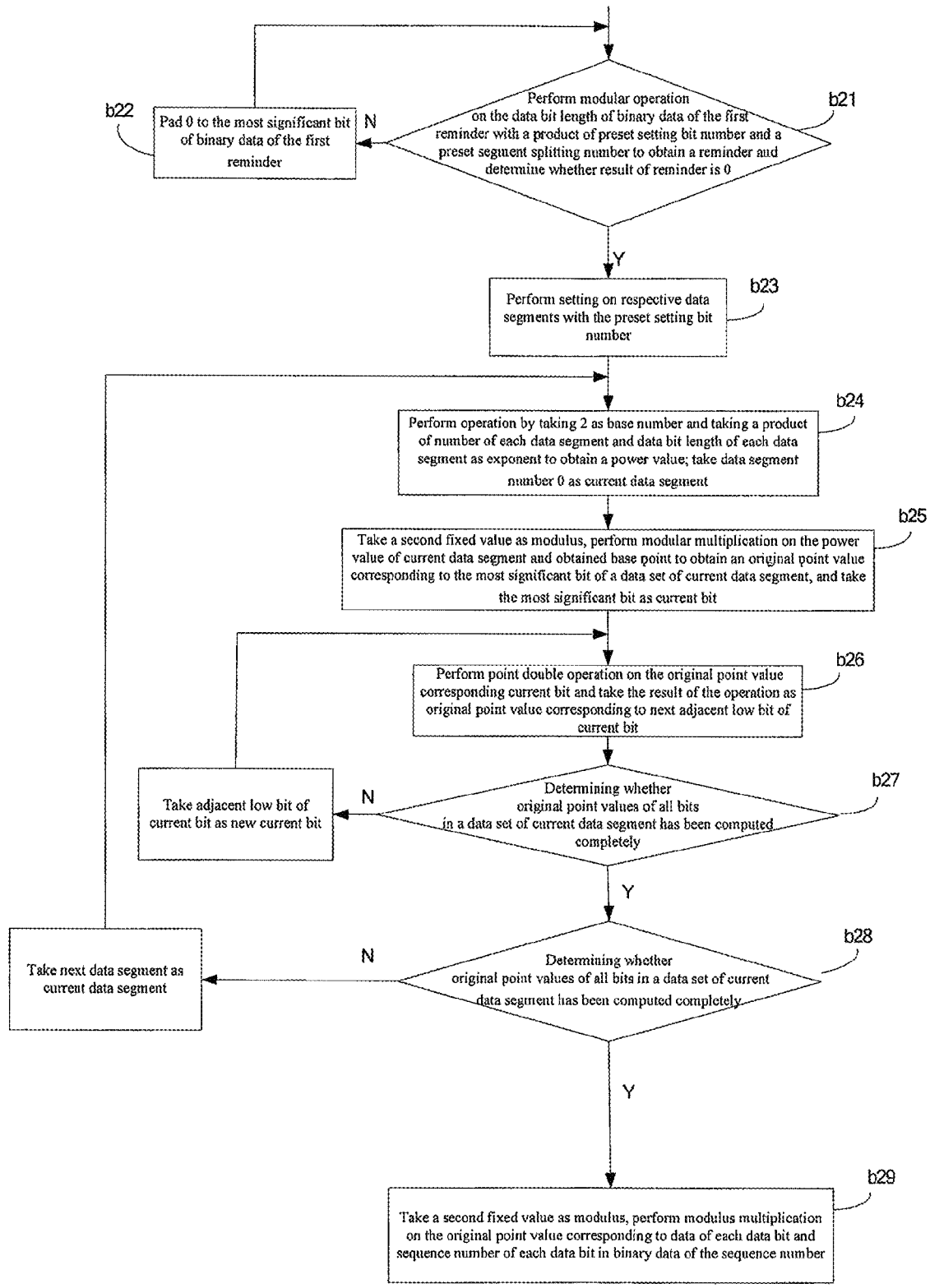
FIG. 2 is detailed flow chart for generating an initial value in the method provided by embodiment 1 of the present invention.

Referring to FIG. 2, specifically calculating the initial point value of each sequence number in Embodiment 1 includes:

Step b21, obtaining a reminder by performing modular operation on the data bit length of the binary data of the first reminder with a product of the preset step length and the preset segment splitting number; determining whether the reminder is 0, if yes, going to Step b23; otherwise, going to Step b22.

For example, the binary data of the first reminder is 101110100; the preset segment splitting number is 3; the preset step length is 3; thus the result of modular operation is 0, go to Step b23.

For example, the binary data of the first reminder is 1011101000111010; the preset segment splitting number is 3; the preset step length is 3; thus the result of the modular operation is 7, go to Step b23.

Step b22, padding 0 to the most significant bit of the binary data of the first reminder and going back to Step b21.

Specifically, in embodiment 1, padding 00 to the most significant bit of the binary data 1011101000111010 of the first reminder so as to obtain the binary data 0010111010001110102.

Step b23, dividing each data segment into sets with the preset step length.

For example, data segments of embodiment 1 respectively are (2)001011, (1)101000, and (0)111010; result of dividing each data segment in sets with the preset step length 3 includes (2)001, 011, (1)101, 000, (0)111, 010.

Step b24, taking 2 as base number and taking a product of number of each data segment and data bit length of each data segment as exponent to perform computing so as to obtain a power value; taking the data segment numbered 0 as a current data segment.

For example, data segments respectively are (2)001011, (1)101000, (0)111010; the obtained three power values are respectively $2^{2\times6}$, $2^{1\times6}$, $2^{0\times6}$; the current data segment is (0)111010.

Step b25, taking the second fixed value as modulus; performing modular multiplication on the power value and the obtained base point so as to obtain the original point value corresponding to the most significant bit in a data set of the current data segment; and taking the most significant bit as current bit.

In embodiment 1, the base point is $G(x, y)$, and the current data set in the current data segment is 111; then the original point value corresponding to the most significant bit is $2^{0\times6}*G(x, y)$, i.e. $G(x, y)$.

Step b26, performing a point double operation on the original point value corresponding to the current bit, and taking the result of the operation as the original point value corresponding to the low bit adjacent to the current bit.

In embodiment 1, all of the original point values calculated from the current data segment 111 are $2^{0\times6}*G(x, y)$, $2*2^{0\times6}*G(x, y)$, $2*2*2^{0\times6}*G(x, y)$, and respectively.

Step b27, determining whether all original point values corresponding to all bits in a data set of the current data segment are calculated completely, if yes, going to Step b28; otherwise, taking the low bit adjacent to the current bit as new current bit and going back to Step b26.

Step b28, determining whether computing of all original point values corresponding to all bits in a data segment of all data segments has completed; if yes, going to Step b29; otherwise, taking next data segment as the current data segment and going back to Step b24.

In embodiment 1, the current data sets of all data segments is (2)001(1)101, (0)111; the corresponding original point values are respectively (2)$2^{2\times6}*G(x, y)$, $2*2^{2\times6}*G(x, y)$, $2*2*2^{2\times6}*G(x, y)$, (1) $2^{1\times6}*G(x, y)$, $2*2^{1\times6}*G(x, y)$, $2*2*2^{1\times6}*G(x, y)$, (0)$2^{0\times6}*G(x, y)$, $2*2^{0\times6}*G(x, y)$, and $2*2*2^{0\times6}*G(x, y)$.

Step b29, taking the second fixed value as modulus, performing modular multiplication on the data of each data bit in the binary data of the sequent number and the original point value corresponding to the bit number of each data bit; performing point add operation on all results of modular multiplication so as to obtain the initial point value.

In embodiment 1, specifically, performing a point add operation on a first original point value (a first X-coordinate, a first Y-coordinate) and a second original point value (a second X-coordinate, a second Y-coordinate) includes:

Step a11, obtaining a second fixed value and taking the second fixed value as modulus, performing modulo subtraction on the second Y-coordinate and the first Y-coordinate so as to obtain a first difference; performing modulo subtraction on the second X-coordinate and the first X-coordinate so as to obtain a second difference and performing modulo division on the first difference and the second difference so as to obtain a first reference.

Step a12, taking the second fixed value as modulus, performing modulo multiplication on the first reference and the first reference so as to obtain a first product and performing modular subtraction operation on the first product and the first X-coordinate and the second X coordinate so as to obtain an initial X-coordinate.

Step a13, taking the second fixed value as modulus, performing modular subtraction on the first X-coordinate and a third X-coordinate so as to obtain a third difference, performing modular multiplication on the third difference and the first reference so as to obtain a second product and performing modular subtraction on the second product and the first Y-coordinate so as to obtain an initial Y-coordinate.

For example, a sequence number in embodiment 1 is 372, its corresponding binary data is 101110100; then the corresponding initial point value of the sequence number is $$Q372=1*2^{2\times6}*G(x,y)+0*2*2^{2\times6}*G(x,y)+\\1*2*2*2^{2\times6}*G(x,y)+1*2^{1\times6}*G(x,y)+1*2^{1\times6}*\\G(x,y)+0*2*2*2^{1\times6}*G(x,y)+1*2^{0\times6}*G(x,y)+\\0*2*2^{0\times6}*G(x,y)+0*2*2*2^{0\times6}*G(x,y).$$

If the preset step length is 1, computing the initial point value of the sequence number includes:

Step b11, taking 2 as base number, taking a product of number of each data segment and data bit length of each data segment as exponent to compute a power value; taking the second fixed value as modulus, performing modular multiplication on the power value and the obtained base point so as to obtain a corresponding original point value.

In embodiment 1, the data segments are (2)001011, (1)101000, and (0)111010; the obtained power value respectively are $2^{2\times6}$, $2^{1\times6}$, and $2^{0\times6}$; the original point values obtained by computing specifically are $2^{2\times6}*G(x,y)$, $2^{1\times6}*G(x,y)$, and $2^{0\times6}*G(x,y)$.

Step b12, taking the second fixed value as modulus, performing modular multiplication on the data of each data bit of the binary data of sequence number and the original point value corresponding to the number which is identical to the bit number of each data bit and performing point add operation on the result of modular multiplication so as to obtain the initial point value.

For example, the sequence number is 6, corresponding binary data of the sequence number is 110; the obtained initial point value is:

$$1*2^{2\times6}*G(x,y)+1*2^{1\times6}*G(x,y)+0*2^{0\times6}*G(x,y).$$

Step S6, obtaining a first set of data of each data segment and taking the first set of data as current data set.

Specifically, for example, the data segments in embodiment 1 are (2)001011, (1)101000, and (0)111010, respectively; then the current data sets are 001, 101, and 111, respectively.

Step S7, checking whether data in the current data set of each data segment is 0, if yes, going to Step S8; otherwise, going to Step S9.

Step S8, taking next set of data of each data segment as current data set, going back to Step S7.

Step S9, computing sequence number according to data in the current data set of each data segment and obtaining corresponding initial point value from the initial value list.

Specifically, for example, the data segments are 001, 101, and 111, combining to form a new binary data 001101111, and obtained sequence number is 111; the obtained corresponding initial point value is $$Q111=0*2^{2\times6}*G(x,y)+0*2*2^{2\times6}*G(x,y)+1*2*\\2*2^{2\times6}*G(x,y)+1*2^{1\times6}*G(x,y)+0*2*2^{1\times6}*G(x,\\y)+1*2*2*2^{1\times6}*G(x,y)+1*2^{0\times6}*G(x,y)+\\1*2*2^{0\times6}*G(x,y)+1*2*2*2^{0\times6}*G(x,y).$$

Step S10, determining whether a next set of data which is not processed in each data segment, if yes, taking the next set of data as current data set and going to Step S11; otherwise, taking the initial point value as a result point value and storing next the result point value; the operation is ended.

Taking next set of data 011,000,010 as current data set.

Step S11, performing point double operation on the initial point value for a number of times of the preset step length and taking the result of the operation as a mid-point value.

Specifically, the preset step length in Embodiment 1 is 3; then performing point double operation for 3 times; the mid-point value specifically is 2*2*2*Q111.

In embodiment 1, detailed process of performing the point double operation is:

Step h1, taking the second fixed value as modulus, performing modular multiplication on the initial point value x-coordinate and the initial point value y-coordinate so as to obtain a second product; performing modular addition operation on three times of the second product and a third fixed value so as to obtain a first sum value; performing the first sum value and two times of the first initial point value y-coordinate so as to obtain a second reference.

Step h2, taking the second fixed value as modulus, performing modular multiplication on the second reference and the second reference so as to obtain a third product, performing modular subtraction operation on the third product and two times of the initial point value y-coordinate so as to obtain a mid-point value y-coordinate.

Step h3, taking the second fixed value as modulus, performing modular subtraction on the initial point value x-coordinate and the mid-point y-coordinate so as to obtain a fourth difference, performing modular multiplication on the second reference and the fourth difference so as to obtain a fourth product; performing modular subtraction on the fourth product and the initial point value y-coordinate so as to obtain a mid-point value y-coordinate.

Step S12, detecting whether data in the current data set of each data segment is 0, if yes, going to Step S13; otherwise, going to Step S14.

In embodiment 1, the current data set 011, 000, 010 is not all 0, go to Step S14.

Step S13, taking the mid-point value as result point value, going to Step S15.

Step S14, computing a sequence number according to data in the current data set of each data segment, obtaining corresponding initial point value from the initial value list according to the sequence number, performing point add operation on the initial point value the mid-point value so as to obtain a result point value, go to Step S15.

In embodiment 1, the sequence number obtained according to the current data sets 011, 000, 010 is 194 and the obtained initial point value specifically is:

$$Q194=0*2^{2\times6}*G(x,y)+1*2*2^{2\times6}*G(x,y)+1*2*2*\\2^{2\times6}*G(x,y)+0*2^{1\times6}*G(x,y)+0*2*2^{1\times6}*G(x,y)+\\0*2*2*2^{1\times6}*G(x,y)+1*2^{0\times6}*G(x,y)+0*2*2^{0\times6}*\\G(x,y)+0*2*2*2^{0\times6}*G(x,y).$$

the result point value obtained by computing is 2*2*2*Q111+Q194.

Step S15, determining whether processing of all data sets of each data segment has completed, if yes, storing the result point value, the operation is ended; otherwise, going to Step S16.

The final stored result point value in Embodiment 1 is 2*2*2*Q111+Q194.

Step S16, taking the result point value as initial point value and taking next data set of each data segment as current data set, going back to Step S11.

Embodiment 2

Figure 3:
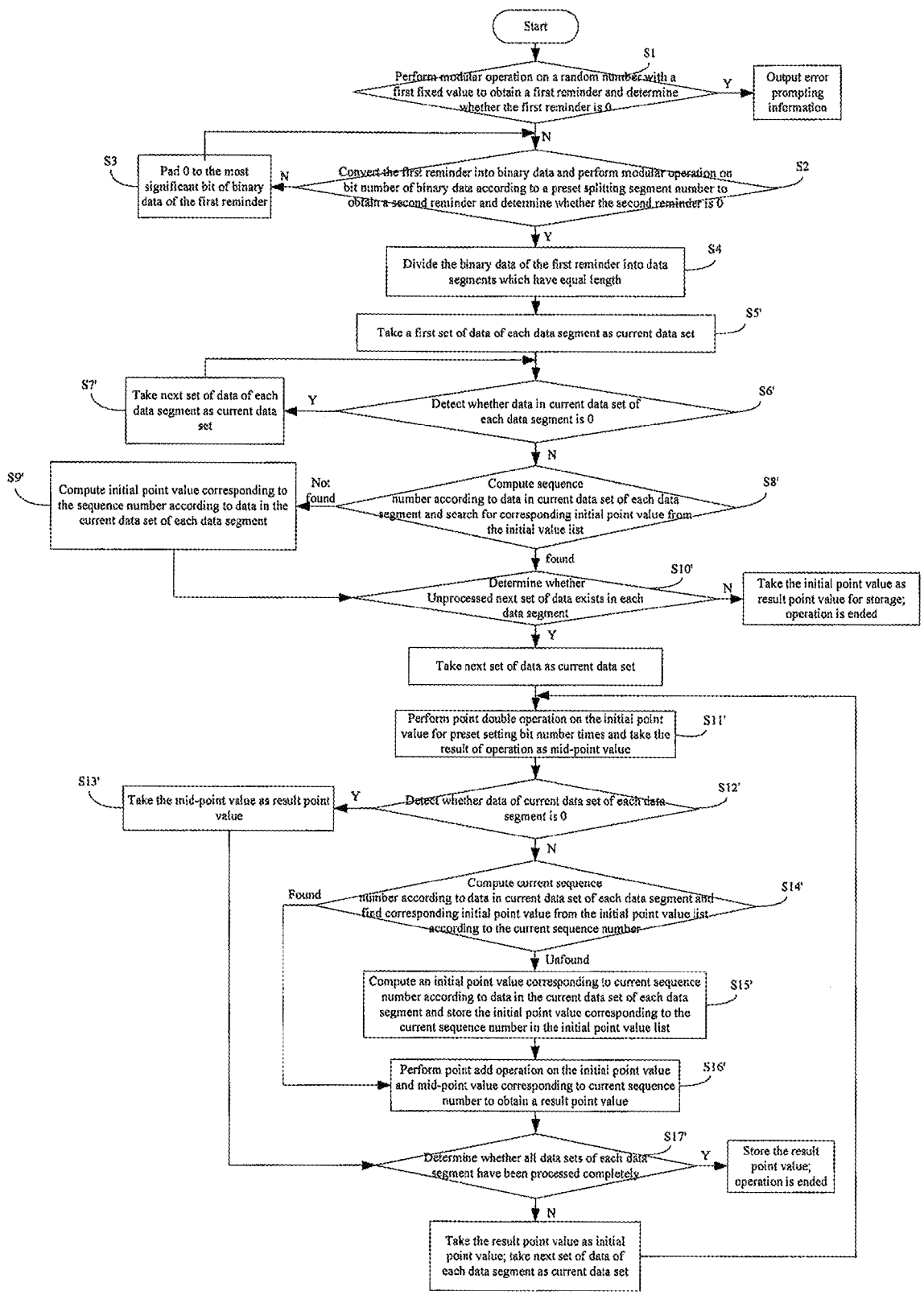
FIG. 3 is a flow chart of a method for quickly generating coordinate points in an embedded system provided by embodiment 2 of the present invention.

Embodiment 2 provides a method for generating coordinate points in an embedded system, which predefines an elliptic curve and can be implemented by, when hardware source is enough, splitting a generated random number into a plurality of segments in a prime number domain. For example, the generated random number is split in 3 segments. In Embodiment 2, a sequence number and an initial point value are computed in operating process and the implementing process is shown by FIG. 3. Step S5 to Step S16 are replaced by Step S5' to Step S17.

Step S5', taking a first set of data of each data segment as a current data set.

Specifically, segments in embodiment 2 are (2)001011, (1)101000, (0)111010, respectively; then the current data sets are 001, 101, 111, respectively.

Step S6', checking whether data in current data set of each data segment is 0, if yes, go to Step S7'; otherwise, go to Step S8.

Step S7', taking a next data set of each data segment as the current data set and going back to Step S6'.

Step S8', searching for corresponding initial point value from an initial value list according to data computing sequence number in current data set of each data segment, if the initial point value is found, going to Step S10'; if the initial point value is not found, going to Step S9.

In embodiment 2, the implementing method of computing sequence number can refer to Step S4 in embodiment 1, i.e., the sequence number obtained by computing according to data 001,101,111 in the current data set; specifically, binary data 001101111 after combination is converted into decimal data 111.

Step S9', computing an initial point value corresponding to the sequence number according to data in current data set of each data segment and storing the sequence number and its corresponding initial point value in the initial value list and going to Step S10'.

If the initial point value corresponding to the sequence number 111 is not obtained in Step S8', specifically obtaining the initial point value by computing in Step S9' includes performing modular multiplication on data of current data set of each segment and corresponding initial point value, performing point add operation on the result of the modular multiplication so as to obtain the initial point value; for example, the current data sets of each data segment are 001,101, 111; process of computing corresponding initial point value specifically includes:

$Q111 = 0*2^{2\times 6}*G(x,y)+0*2^{2\times 6}*G(x,y)+1*2*$
$2*2^{2\times 6}*G(x,y)+1*2^{1\times 6}*G(x,y)+0*2^{1\times 6}*G(x,$
$y)+1*2*2*2^{1\times 6}*G(x,y)+1*2^{0\times 6}*G(x,y)+$
$1*2*2^{0\times 6}*G(x,y)+1*2*2*2^{0\times 6}*G(x,y).$ Step S10', determining whether unprocessed next set of data exists in each data segment, if yes, go to Step S11'; otherwise, taking the initial point value as a result point value for storage; ending operation.

In embodiment 2, unprocessed next set of data 011, 000, 010 exists.

Step S11', performing point double operation on the initial point value for a preset step length times and recording the result as a mid-point value.

In embodiment 2, performing point double operation on the initial point value Q111 for three times so as to obtain mid-point value 2*2*2*Q111.

Step S12', detecting whether data in the current data set of each data segment is 0, if yes, go to Step S13'; otherwise, going to Step S14'.

In embodiment 2, the data in current data sets 011, 000, 010 is not all 0, go to Step S14'.

Step S13', taking the mid-point value as result point value and going to Step S17'.

Step S14', computing the current sequence number according to data in the current data set of each data segment and searching for corresponding initial point value in an initial value list according to the current sequence number, if the initial point value is found, going to Step S16', if the initial point value is not found, going to Step S15'.

In embodiment 2, the sequence number obtained by computing according to the current data sets 011,000,010 is 194; if the corresponding initial point value Q194 is found in the initial point value list, going to Step S16'; if the corresponding initial point value Q194 is not found in the initial point value list, going to Step S15'.

Step S15', computing the initial point value corresponding to current sequence number according to the data in the current data set of each data segment, storing the current sequence number and corresponding initial point value in the initial point value list, going to Step S16.

Computing initial point value corresponding to the sequence number 194 in embodiment 1 can refer to Step S14 in embodiment 1; no more detail is given here.

Step S16', performing point add operation on the initial point value corresponding to the current sequence number and the mid-point value so as to obtain a result point value.

In embodiment 2, the result point value obtained by computing is 2*2*2*Q111+Q194.

Step S17', determining whether all data sets of each data segment have been processed completely, if yes, storing the result point value; ending operation; otherwise, taking the result point value as the initial point value and taking next set of data of each data segment as current data segment, going to Step S11'.

Embodiment 3

Figure 4:
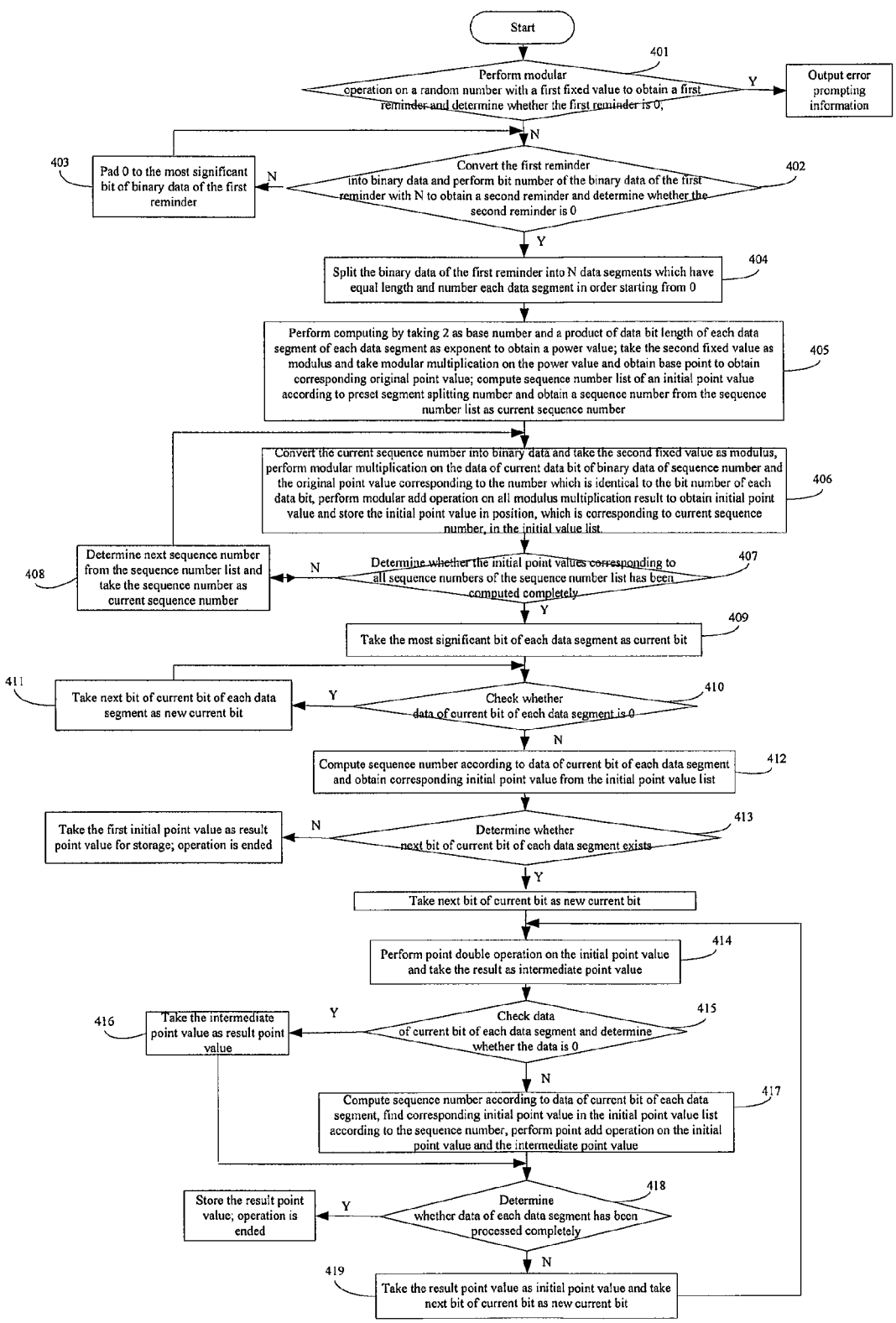
FIG. 4 is a flow chart of a method for quickly generating coordinate points in an embedded system provided by embodiment 3 of the present invention.

Embodiment 3 provides a method for generating coordinate points in an embedded system, which predefines an elliptic curve and can be implemented by, when hardware source is enough, splitting a generated random number into a plurality of segments in a prime number domain. Specifically, for example, the preset segment splitting number is N and the preset step length is 1; The sequence number and corresponding initial point value in embodiment 3 are computed in advance. Referring to FIG. 4, the method provided by embodiment 3 includes:

Step 401, performing modular operation on the random number with a first fixed value so as to obtain a first reminder, determining whether the first reminder is 0, if yes, outputting error information, otherwise, going to Step 402.

In embodiment 3, before Step 401, the method further includes:

Step 400, generating the random number and obtaining the first fixed value.

In Step 400, if error information is output, procedure of generating random number can keep on; then going to Step 401.

Step 402, converting the first reminder into a binary data, performing modular operation on the bit number of the binary data of the first reminder with N so as to obtain a second reminder and determining whether the second reminder is 0, if yes, going to Step 404; otherwise, going to Step 403.

Step 403, padding 0 to the most significant bit of the binary data of the first reminder and going back to Step 404.

Step 404, splitting the binary data of the first reminder into N data segments and numbering each data segment orderly from 0.

For example, the first reminder is 10011111011001 in embodiment 3; splitting the first reminder into 5 segments which are 010, 011, 111, 011, and 001.

In embodiment 3, for example, splitting the first reminder into N segments with fixed length; those N segments are recorded as a zeroth segment, a first segment, a second segment, . . . , a N−1 segment; for example, the first reminder is split into 4 segments which are respectively recorded as the zeroth segment, the first segment, the second segment and the third segment.

Step 405, performing computing by taking 2 as base number and taking a product of a number of each data segment and data bit length of each data segment as exponent so as to obtain a power value; taking the second fixed value as modulus and performing modular multiplication on the power value and the obtained base point so as to obtain a corresponding original point value; computing a sequence number list of original point value according to the preset segment splitting number N, obtaining a sequence number from the sequence number list and taking a sequence number as a current sequence number.

For example, splitting the first reminder into N segments in embodiment 3, then the sequence numbers in the sequence number list generated by binary data with N bits includes 1, 2, 3, . . . , $2^N-1$; for example, if the first reminder is split into 5 segments, the sequence numbers in the sequence number list include all integral numbers from 1 to ($2^5-1$); i.e. the sequence numbers in the sequence number list are 1, 2, 3, 4, . . . , 29, 30, 31; in this case, each data segment length is L; number of each data segment is recorded as i, of which value is ranged from 0 to (N−1); the base point is recorded as G(x, y), then the original point value corresponding to data segment numbered i is $2^{i \times L}*G(x, y)$.

Specifically, in embodiment 3, the first reminder is split into 5 segments; length of each data segment is 3; the original point value corresponding to the zeroth segment is $2^{0 \times 3}*G(x, y)$; the original point value corresponding to the first segment is $2^{1 \times 3}*G(x, y)$; the original value corresponding to the second segment is $2^{2 \times 3}*G(x, y)$, the original point value corresponding the third segment $2^{3 \times 3}*G(x, y)$, the original point value of the fourth segment is $2^{4 \times 3}*G(x, y)$.

In embodiment 3, the second fixed value is taken as modulus for modular multiplication and modular addition in above computing process.

Step 406, converting the current sequence number into binary data, taking the second fixed value as modulus, performing modular multiplication on the data of current data bit of binary data of the sequence number and the original point value corresponding to the number which is identical to the bit number of each data bit, performing point addition on all modular multiplication result so as to obtain the original point value and storing the initial point value in position corresponding to the current sequence number in the initial value list.

In embodiment 3, if the first reminder is split into N segments, the data in the initial value list specifically includes a first initial point value, a second initial point value, a third initial point value, . . . , the $2^N-1$ initial point value.

Specifically, the first reminder is split into 5 segments; there are 31 initial point values in the initial value list; for example, the sequence number 13 is converted into binary data 1101; 1, 1, 0, 1 in the binary data are corresponding to bit number 3, 2, 1, 0, respectively; the initial point value corresponding to current sequence number 13 is:

$1*2^{3 \times 3}*G(x,y)+1*2^{2 \times 3}*G(x,y)+0*2^{1 \times 3}*G(x,y)+1*2^{0 \times 3}*G(x,y);$ the second fixed value is taken as the modulus in above computing process.

In step 407, determining whether the initial point values corresponding to all sequence numbers in the sequence number list have been computed completely, if yes, go to Step 409; otherwise, go to Step 408.

Figure 5:
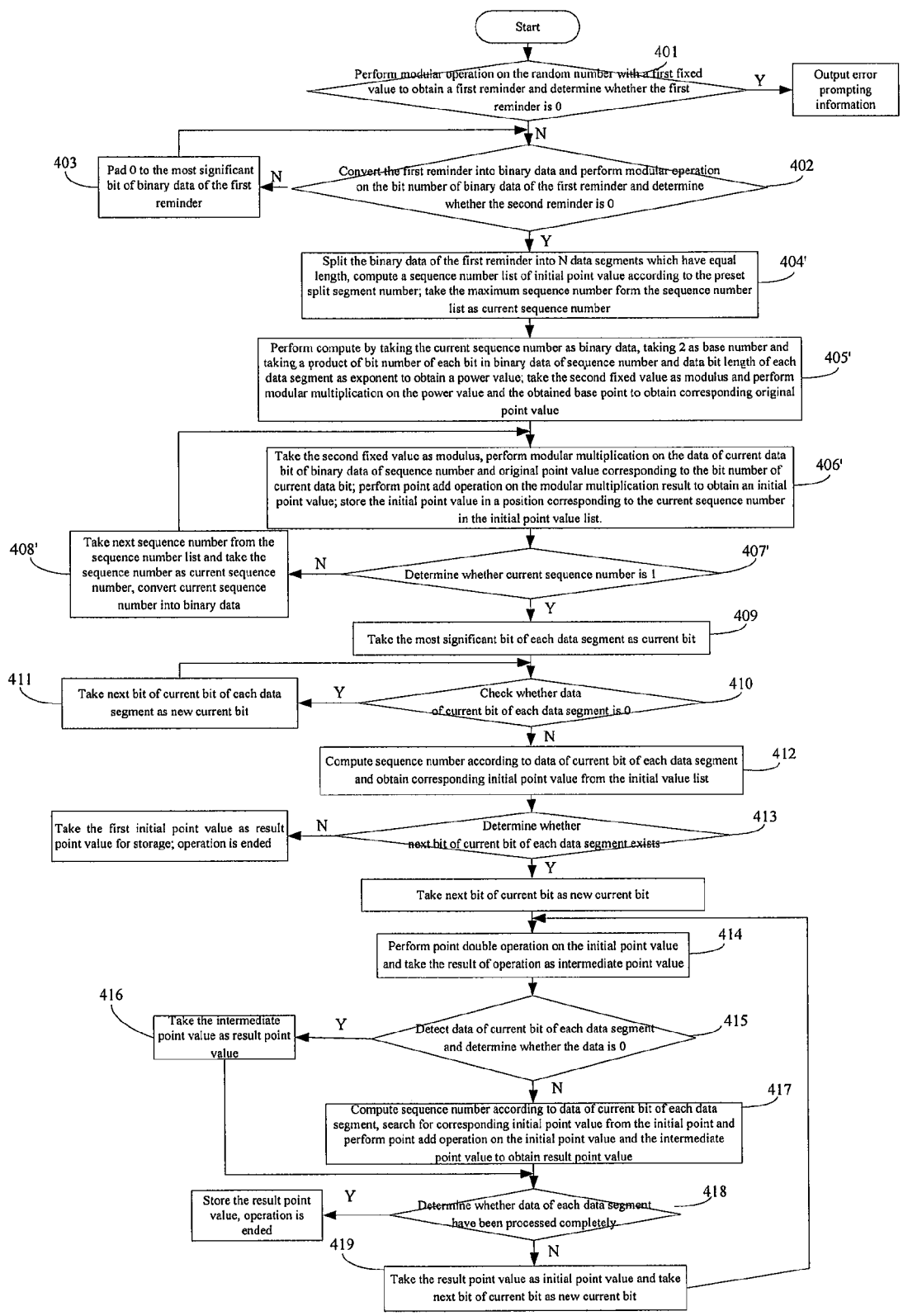
FIG. 5 is a flow chart of a method for quickly generating coordinate points in an embedded system provided by embodiment 3 of the present invention.

Preferably, in embodiment 3, the initial point value is computed according to the sequence numbers in order from big to small, then Step 404 to Step 407 can be replaced by Step 404' to Step 407', as shown by FIG. 5.

Step 404', the binary data of the first reminder is split into N data segments with equal length; computing a sequence number list of initial value according to the preset segment splitting number and obtaining a maximum sequence number from the sequence number list and taking the maximum sequence number as current sequence number.

In embodiment 3, the first reminder is divided into 5 segments, and the sequence numbers of the sequence number list are 1, 2, 3, . . . , 29, 30, 31.

Step 405', converting the current sequence number as binary data and taking 2 as base number; taking a product of bit number of each bit of data in binary data of the sequence number and data bit length of each data segment as exponent so as to obtain a power value; taking the second fixed value as modulus and performing modular multiplication on the power value and the obtained base point so as to obtain a corresponding original point value; taking the second fixed value as modulus and performing modular multiplication on the power value and the obtained base point so as to obtain a corresponding original point value.

In embodiment 3, if the data of the binary data of current sequence number has L bits, L corresponding original point values exist.

Specifically, in embodiment 3, the obtained maximum sequence number is 31; the converted binary data is 11111; bit numbers of respective bits of data in the binary data are 4, 3, 2, 1, 0; the corresponding original point values are $2^{4 \times 3}*G(x, y)$, $2^{3 \times 3}*G(x, y)$, $2^{2 \times 3}*G(x, y)$, $2^{2 \times 3}*G(x, y)$, $2^{0 \times 3}*G(x, y)$.

Step 406', taking the second fixed value as modulus, performing modular multiplication on the data of the current data bit of the binary data of a sequence number and the original point value corresponding to the bit number of the current data bit; performing point add operation on all modular multiplication results so as to obtain the initial point value; storing the initial point value to position corresponding to the current sequence number in the initial value list.

In embodiment 3, computing the initial point value corresponding to the current sequence number 31 includes:

$1*2^{4 \times 3}*G(x,y)+1*2^{3 \times 3}*G(x,y)+1*2^{2 \times 3}*G(x,y)+1*2^{1 \times 3}*G(x,y)+1*2^{0 \times 3}*G(x,y);$ the second fixed value is taken as modulus in above computing process.

Step 407', determining whether the current sequence number is 1, if yes, going to Step 409; otherwise, going to Step 408'.

Figure 6:
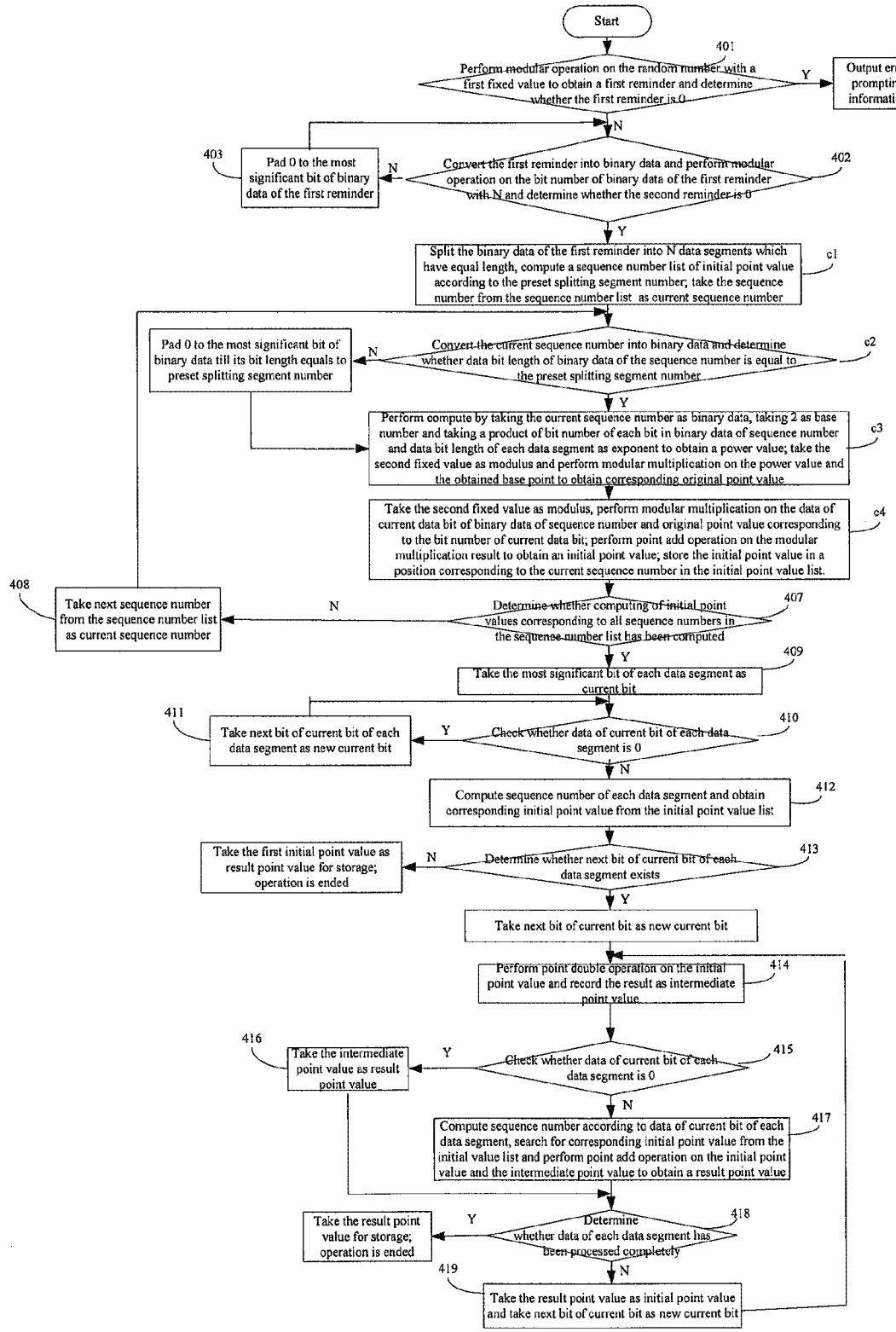
FIG. 6 is a flow chart of a method for quickly generating coordinate points in an embedded system provided by embodiment 3 of the present invention.

In embodiment 3, obtaining a sequence number from the sequence number list to computing the initial point value corresponding to the sequence number; therefore, in Step 404, it is unnecessary to number each data segment; referring to FIG. 6, Step 404 to Step 406 is replaced with Step c1 to Step c4.

Step c1, splitting the binary data of the first reminder into N data segments, computing a sequence number list of the initial point value according to the preset segment number; taking a sequence number from the sequence number list and taking the sequence number as current sequence number.

For example, the obtained sequence number in the step of embodiment 3 is 18.

Step c2, converting the current sequence number as binary data, determining whether the data bit length of the binary data of the sequence number is equal to the preset segments splitting number, if yes, going to Step c3; otherwise, padding 0 to the most significant bit of the binary data till the data bit data length is equal to the preset segment splitting number; going to Step c3.

If the sequence number 18 is converted to binary data 10010; the data bit length is 5 which is identical to the preset segment splitting number, going directly to Step c3.

Step c3, taking 2 as base number, taking a product of bit number, which is recorded as i and ranged from 0 to (N−1), of each data in the binary data of the sequence number and the data bit length L of each data segment as exponent for computing so as to obtain a power value; taking the second fixed value as modulus and performing modular multiplication on the power and base point so as to obtain an original point value.

In Step c3, the process of obtaining the original point value can refer to implementing process of Step 405'.

Step c4, taking the second fixed value as modulus, performing modular multiplication on the data of each bit of binary data of the sequence number and its corresponding original point value, performing point add operation on the modular multiplication result so as to obtain an initial point value, storing the initial point value in the place corresponding to the current sequence number.

For example, the initial point value corresponding to the sequence number 18 specifically is $$1*2^{4\times3}*G(x,y)0*2^{3\times3}*G(x,y)+0*2^{2\times3}*G(x,y)+1*2^{1\times3}*G(x,y)+0*2^{0\times3}*G(x,y).$$

Step 408, obtaining a next sequence number from the sequence number list and take the sequence number as the current sequence number and going back to Step 406.

If the above described process is obtaining a sequence number from the sequence number list randomly to compute its corresponding initial point value, go back to Step c2 after performing Step 408, as shown by FIG. 6.

Computing its corresponding initial point value of each sequence number according to the order from the maximum sequence number to the minimum sequence number; Step 408 is replaced by Step 408', obtaining next sequence number from the sequence number list and taking the next sequence number as current sequence number, converting the current sequence number into binary data and going back to Step 406', as shown by FIG. 5.

Specifically, the initial point value list and the sequence number list in embodiment 3 are shown as the following:

| Sequence number | Initial point value |
|---|---|
| 1 | $Q_1 = G(x, y)$ |
| 2 | $Q_2 = 2^{1\times3} *G(x, y)$ |
| 3 | $Q_3 = G_1 + G_2$ |
| 4 | $Q_4 = 2^{2\times3} *G(x, y)$ |
| 5 | $Q_5 = G_1 + G_4$ |
| 6 | $Q_6 = G_2 + G_4$ |
| 7 | $Q_7 = G_1 + G_2 + G_4$ |
| 8 | $Q_8 = 2^{3\times3} *G(x, y)$ |
| 9 | $Q_9 = G_1 + G_8$ |
| 10 | $Q_{10} = G_2 + G_8$ |
| 11 | $Q_{11} = G_1 + G_2 + G_8$ |
| 12 | $Q_{12} = G_4 + G_8$ |
| 13 | $Q_{13} = G_1 + G_4 + G_8$ |
| 14 | $Q_{14} = G_2 + G_4 + G_8$ |
| 15 | $Q_{15} = G_1 + G_2 + G_4 + G_8$ |
| 16 | $Q_{16} = 2^{4\times3} *G(x, y)$ |
| 17 | $Q_{17} = G_1 + G_{16}$ |
| 18 | $Q_{18} = G_2 + G_{16}$ |
| 19 | $Q_{19} = G_1 + G_2 + G_{16}$ |
| 20 | $Q_{20} = G_4 + G_{16}$ |
| 21 | $Q_{21} = G_1 + G_4 + G_{16}$ |
| 22 | $Q_{22} = G_2 + G_4 + G_{16}$ |
| 23 | $Q_{23} = G_1 + G_2 + G_4 + G_{16}$ |
| 24 | $Q_{24} = G_8 + G_{16}$ |
| 25 | $Q_{25} = G_1 + G_8 + G_{16}$ |
| 26 | $Q_{26} = G_2 + G_8 + G_{16}$ |
| 27 | $Q_{27} = G_1 + G_2 + G_8 + G_{16}$ |
| 28 | $Q_{28} = G_4 + G_8 + G_{16}$ |
| 29 | $Q_{29} = G_1 + G_4 + G_8 + G_{16}$ |
| 30 | $Q_{30} = G_2 + G_4 + G_8 + G_{16}$ |
| 31 | $Q_{31} = G_1 + G_2 + G_4 + G_8 + G_{16}$ |

Step 409, taking the most significant bit of each data segment as a current bit.

Specifically, in embodiment 3, five data segments are respectively includes 010, 011, 111, 011, 001.

Step 410, detecting whether data on current bit of each data segment is 0, if yes, going to Step 411; otherwise, going to Step 412.

Step 411, taking next bit of the current bit of each data segment as a new current bit and going back to Step 410.

Step 412, computing the sequence number according to data of current bit of each data segment and obtaining its corresponding initial point value from the initial value list.

For example, obtaining data of current bit 0, 0, 1, 0, 0; combining the data to be decimal data corresponding binary data 001000; recording 4 as the sequence number obtained by computing; obtaining corresponding $G_4$ from the initial list.

Step 413, determining whether next bit of current bit of each data segment exists, if yes, taking next bit of current bit as new current bit and going to Step 414; otherwise, taking the initial point value as a result point value and storing the result point value; then ending the operation.

Step 414, performing a point add operation on the initial point value, and recording the result of point add operation as mid-point value.

Specifically, the mid-point value of Embodiment 3 is $2*G_4$.

Step 415, detecting data of current bit of each data segment and determining whether the data of current bit is 0; if yes, going to Step 416; otherwise, going to Step 417.

In embodiment 3, the data of the current bit in Step 415 is 1, 1, 1, 1, 0, all of which are not 0; going to Step 417.

Step 416, taking the mid-point value as result point value; going to Step 418.

Step 417, computing a sequence number according to data on the current bit of each data segment and searching for corresponding initial point value in the initial value list according to the sequence number; performing point add operation on the initial point value and the mid-point value so as to obtain the result point value; going to Step 418.

In embodiment 3, obtaining sequence number 30 by computing according to the data of the current bit; obtaining initial point value $G_{30}$ from the initial point list; the result point value obtained by computing is $2*G_4+G_{30}$.

Step 418, determining whether data of each data segment has been processed completely, if yes, storing the result point value, and operation is ended; otherwise, going to Step 419;

Step 419, taking the result point value as initial point value, taking next bit of current bit as new current bit and going back to Step 414.

In embodiment 3, 5 segments which are obtained by splitting are 010, 011, 111, 011, 001, the final stored result point value is $2*(2*G_4+G_{30})+G_{15}$.

The initial point value of embodiment 3 can be computed when it is required; that is, computing the sequence number and searching for corresponding initial point value in the initial value list; if the initial point value is found, keeping on perform operation; if the initial point value is not found, computing the initial point value and storing the initial point value in the initial point value list for next time usage; performing process after that the initial point value is computed can refer to Embodiment 2; no more detail is given here.

Embodiment 4

Figure 7:
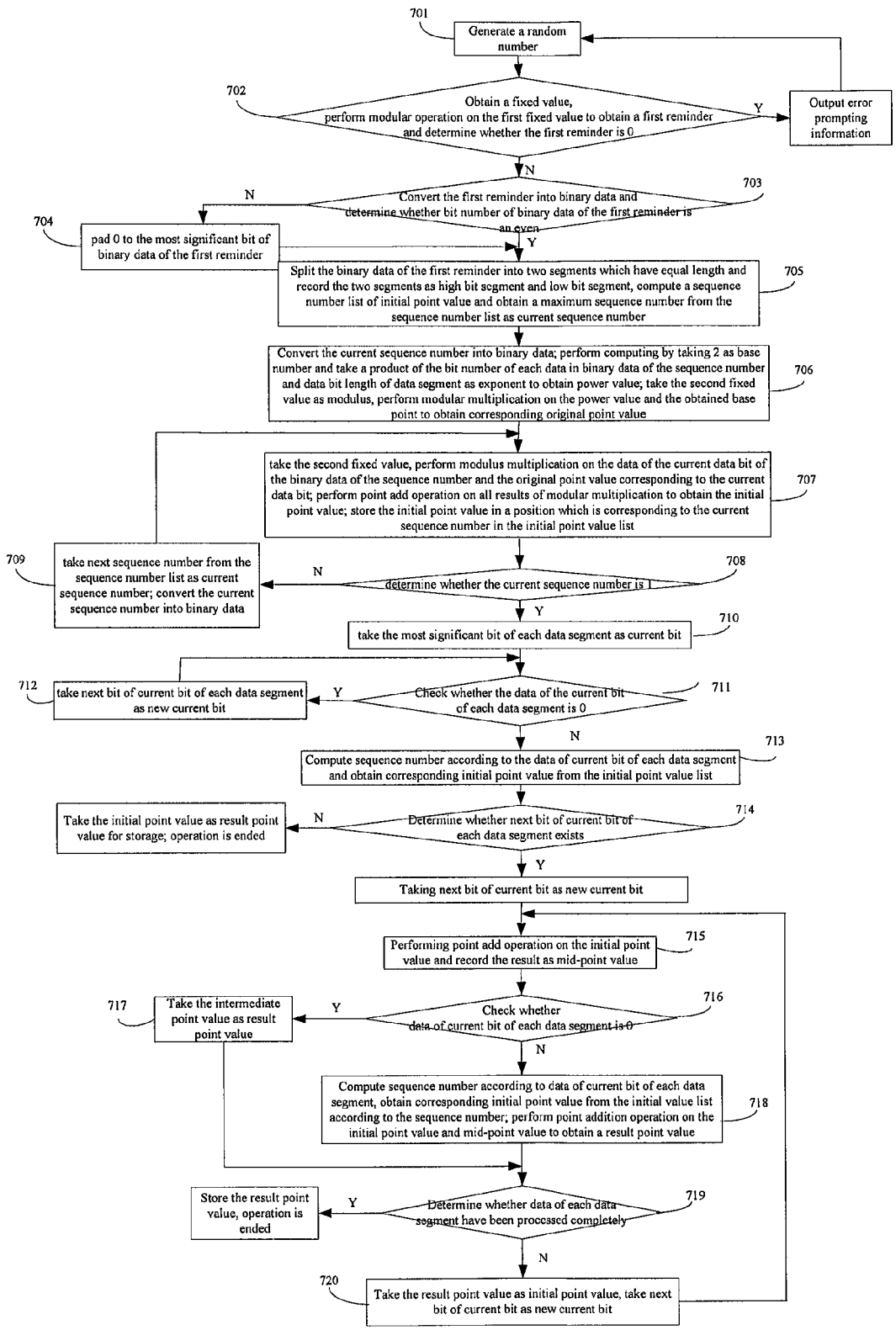
FIG. 7 is a flow chart of a method for quickly generating coordinate points in an embedded system provided by embodiment 4 of the present invention.

Embodiment 4 provides a method for quickly generating coordinates in an embedded system, which predefines an elliptic curve and can be implemented by, when hardware source is enough, splitting a generated random number into a plurality of segments in a prime number domain. In embodiment 3, the random number is split into 2 segments. For example, the preset step length is 1. The initial point value is stored in the initial point value list. As shown by FIG. 7, the method of embodiment 3 includes:

Step 701, generating a random number.

Step 702, obtaining a first fixed value, performing modular operation on the random number with the first fixed value and recording the result as a first reminder; determining whether the first reminder is 0, if yes, output error information; going back to Step 701; otherwise, going to Step 703.

In embodiment 3, the first fixed value is determined by the predefined elliptic curve; specifically, the first fixed value is FFFFFFFFEFFFFFFFFFFFFFFFFFFFFFFFF7203DF6-B21C6 052B53BBF40939D54123; the error information is infinity point;

Step 703, converting the first reminder into binary data, determining whether the bit number of binary data of the first reminder is an even, if yes, going to Step 705; otherwise, going to Step 704.

Step 704, padding 0 to the most significant bit of binary data of the first reminder; going to Step 705.

Step 705, splitting the binary data of the first reminder into two parts with same length, recording the two parts as high bit segment and low bit segment; computing the sequence number list of initial point value; obtaining the maximum sequence number from the sequence number list and taking the maximum sequence number as current sequence number.

Specifically, in embodiment 4, the implementing method for computing initial point value list according to the length value is identical to that of Embodiment 3; i.e. the sequence numbers in the sequence number list specifically are 3, 2, 1.

Step 706, converting the current sequence number into binary data; performing computing by taking 2 as base number and taking a product of the bit number of each data in binary data of the sequence number and data bit length of data segment as exponent so as to obtain power value; taking the second fixed value as modulus, performing modular multiplication on the power value and the obtained base point so as to obtain a corresponding original point value.

Obtaining a point from the predefined elliptic curve so as so as to obtain x-coordinate and y-coordinate of the point, which is the base point; specifically, the base point (G(x, y)) is:

Gx=32C4AE2C1F1981195F9904466A39C9948FE3-0BBFF2660BE1715A4589334C74C7,

Gy=BC3736A2F4F6779C59BDCEE36B692153D0A-9877CC62A474002DF32E52139F0A 0).

Specifically, in embodiment 4, the binary data is split into two parts, length of each part is L; in embodiment 4, the sequence number is converted into binary data with two bits; the original point value obtained by computing in Step 706 specifically is $2^{1 \times L}*G(x, y)$, $2^{0 \times L}*G(x, y)$.

Step 707, taking the second fixed value as modulus, performing modular multiplication on the data of the current data bit of the binary data of the sequence number and the original point value corresponding to the current data bit; performing point add operation on all results of modular multiplication so as to obtain the initial point value; storing the initial point value in a position which is corresponding to the current sequence number in the initial point value list.

Step 708, determining whether the current sequence number is 1, if yes, going to Step 710; otherwise, going to Step 709.

Step 709, obtaining a next sequence number from the sequence number list and taking the sequence number as the current sequence number; converting the current sequence number into binary data; going back to Step 707.

In embodiment 4, splitting the first reminder into two parts, the maximum sequence number is 3; the initial point value list specifically is as the following:

| Sequence number | Initial point value |
| --- | --- |
| 1 | $G_1 = 2^{0 \times L} *G(x, y)$ |
| 2 | $G_1 = 2^{1 \times L} *G(x, y)$ |
| 3 | $G_3 = 2^{1 \times L} *G(x, y) + 2^{0 \times L} *G(x, y)$ |

Step 710, taking the most significant bit of each data segment as current bit.

Step 711, checking whether the data of the current bit of each data segment is 0, if yes, going to Step 712; otherwise, going to Step 713.

Step 712, taking next bit of current bit of each data segment as a new current bit; going back to Step 711.

Step 713, computing the sequence number according to the data of current bit of each data segment and obtaining corresponding initial point value from the initial point value list.

Specifically, for example, the data of current bit of high bit segment and low bit segment is 10; then find an initial point value corresponding to sequence number 2 from the initial value list; finding the initial point value specifically includes initial point value x-coordinate:
B692E5B574D55DA93DB7B24888C21F3A2B2308-F6484E1B38EAE3D9A9D13A42ED, initial point value y-coordinate:
A175051B0F3FB6135A924F85544926F9DB61AC-1773438E6DD186469DE295E5AB.

Step 714, determining whether next bit of current bit of each data segment exists, if yes, taking next bit of current bit as new current bit; going to Step 715; otherwise, taking the initial point value as result point value for storage; ending the operation.

Step 715, performing point add operation on the initial point value and recording the result as mid-point value.

Specifically, determining the third fixed value according to the predefined elliptic curve specifically includes FFFFFFFEFFFFFFFFFFFFFFFFFFFFFFFFFFFFFFFF-F00000000FFFFFFFFFFFFFFFC;

x-coordinate of mid-point value is: EB3A6E8C595DADF2A96AF4197D9AD709AD51-757A765299ABDD616BF72D336B66, y-coordinate of mid-point value is 3DD094C026F102CF7C19769F881763195A8FDC-BFA4EE925BFCEDCCCEA61404D.

Step 716, checking and determining whether data of current bit of each data segment is 0, if yes, going to Step 717; otherwise, going to Step 718.

Step 717, taking the mid-point value as result point value and going to Step 719.

Step 718, computing the sequence number according to data of current bit of each data segment, obtaining corresponding initial point value from the initial value list according to the sequence number; performing a point add operation on the initial point value and mid-point value so as to obtain a result point value; going to Step 719.

Step 719, determining whether data of each data segment have been processed completely, if yes, storing the result point value, ending the operation; otherwise, going to Step 720.

Step 720, taking the result point value as initial point value, taking a next bit of current bit as a new current bit; going back to Step 715.

Embodiment 5

Figure 8:
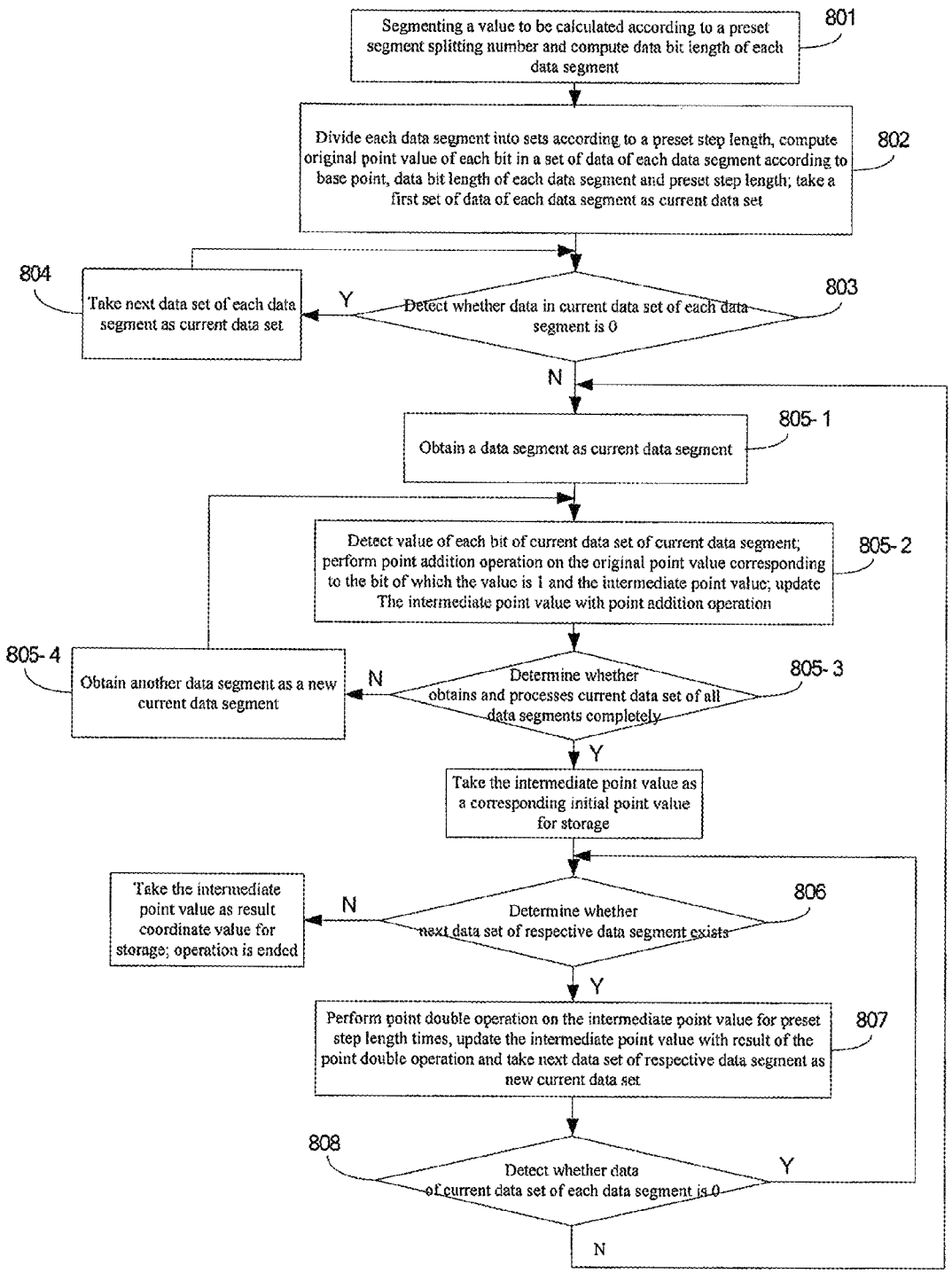
FIG. 8 is a flow chart of a method for quickly generating coordinate points in an embedded system provided by embodiment 5 of the present invention.

Embodiment 5 provides an implementing method for computation by using an initial point value. As shown in FIG. 8, the method includes:

Step 801, segmenting a value to be calculated according to a preset segment splitting number and computing data bit length of each data segment.

Specifically, the value to be calculated is obtained in advance or a binary data string of which length is less than a preset maximum value. If the length of the binary data string is less than the preset maximum value, pad 0 to the most significant bit of the binary data string to make the binary data reach the maximum value. For example, if the maximum value is 32, the binary data string is 11011011001111010100111010101; the binary data string after padding 0 is 00011011011001111010100111010101; preferably, the preset maximum value is integral multiple of the maximum value, for example, 8, in embodiment 5.

Specifically, in embodiment 5, the maximum value is 32; correspondingly, the segmented binary data strings include 00011011, 01100111, 10101001, 11010101. For better illustration, number each segment according to order from low to high, which are recorded as a first segment, a second segment, a third segment and a fourth segment; i.e. the fourth segment is 00011011; the third segment is 01100111; the second segment is 10101001; the first segment is 11010101.

In embodiment 5, before Step 801, the method further includes:

Step a1, generating or obtaining a random number.

Step a2, performing modular operation on a first fixed value so as to obtain a reminder.

Determining whether the reminder is 0, if yes, outputting error prompting information and going back to Step a1; otherwise, converting the random number into binary data so as to obtain a value to be calculated.

Step 802, dividing each data segment into sets according to a preset step length, computing original point value of each bit in a set of data of each data segment according to base point, data bit length of each data segment and preset step length; taking a first set of data of each data segment as current data set.

The base point is determined by the predefined elliptic curve, which is recorded as G(x, y).

In embodiment 5, the preset step length is N; if N is 1, computing each original point value of each segment specifically includes:

the original point value of the first segment is G(x, y).

Set the original point value of the ith segment is $G_i(x, y)$; the data bit length of each data segment is L; then the original point value of the i+1 the segment is $2^L G_i(x, y)$.

Preferably, detailed process of computing $2LG_i(x, y)$ includes:

Step A-1, an initial count value of a counter is set to be 0; taking $G_i(x,y)$ as a current intermediate variable.

Step A-2, performing point double operation on the current intermediate variable; updating the current intermediate variable with result of operation; the count value of the counter adds 1 to itself.

Step A-3, checking whether count value of the counter is L, if yes, obtain the intermediate variable, i.e. $2^L G_i(x, y)$, operation is ended; otherwise, going back to Step A-2.

For example, the preset step length N is 4, then compute original point value corresponding to each bit in a set data of the ith data segment; which specifically includes:

the original point value corresponding to the most significant bit in the set of data of the ith data segment is $G_i(x, y)$.

Step B-1, taking the most significant bit of a data set of current data segment as current bit; the initial value of the second count value is 0.

Step B-2, performing point double operation on the initial point value corresponding to the current bit; the second count value adds 1 to itself; determining whether the second count value is greater than 4, if yes, going to Step B-4; otherwise, going to Step B-3.

Step B-3, taking the next bit as current bit, taking result of point add operation as original value corresponding to new current bit and going back to Step B-2.

Step B-4, determine whether the initial point values corresponding to each bit in a data set of all data segment have been computed completely; if yes, keeping on operation; otherwise, taking a next data segment as current data segment and going back to Step B-1.

Step 803, detecting whether data in current data set of each data segment is 0, if yes, going to Step 804; otherwise, going to Step 805.

Step 804, taking a next data set of each data segment as current data set, going back to Step 803.

Step 805, obtaining a corresponding initial point value according to value of each bit in current data set of each data segment.

Preferably, in embodiment 5, detailed process of computing initial point value includes:

Step 805-1, obtaining a data segment as current data segment.

Step 805-2, detecting a value of each bit of current data set of current data segment. performing point add operation on the original point value corresponding to the bit of which the value is 1 and the mid-point value; updating the mid-point value with the result of the point add operation; going to Step 805-3.

Specifically, the initial value of the mid-point value is 0.

Step 805-3, determining whether obtains and processes current data set of all data segments, if yes, taking the mid-point value as a corresponding initial point value and storing the initial point value, going to Step 806; otherwise, going to Step 805-4.

Step 805-4, obtaining another data segment as a new current data segment, going back to Step 805-2.

For example, the current data sets of respective data segments respectively are a fourth segment 1, a third segment 1, a second segment 0, a first segment 0; then performing point add operation on the original point value corresponding to the fourth segment, the original point value corresponding to the third segment and the mid-point point value.

Step 806, determining whether a next data set of each data segment exists, if yes, going to Step 807; otherwise, taking the mid-point value as a result coordinate value for storage; operation is ended.

Step 807, performing point double operation on the mid-point value for times of the preset step length, updating the mid-point value with result of the point double operation; taking next data set of respective data segment as new current data set.

There are four data segments in embodiment 5 which are a fourth segment 00011011, a third segment 01100111, a second segment 10101001, a first segment 11010101. For example, current bits of respective data segment respectively are a fourth segment 0, a third segment 0, a second segment 1, a first segment 1; then the new current bits after Step 807 are a fourth segment 0, a third segment 1, a second segment 0, a first segment 1.

If the preset step length of embodiment 5 is 1, perform point double operation for 1 time.

Step 808, detecting whether data of current data set of each data segment is 0, if yes, going to Step 806; otherwise, going back to Step 805-1.

In addition, the original point value, which is corresponded to each bit in a data set of respective data segments, obtained by computing for the first time can be stored. The original point value can be used to subsequently calculate a corresponding initial point value according to value of current bit of respective segments except that new calculated references, such as curve, base point or preset segment splitting number, are used.

Embodiment 6

Figure 9:
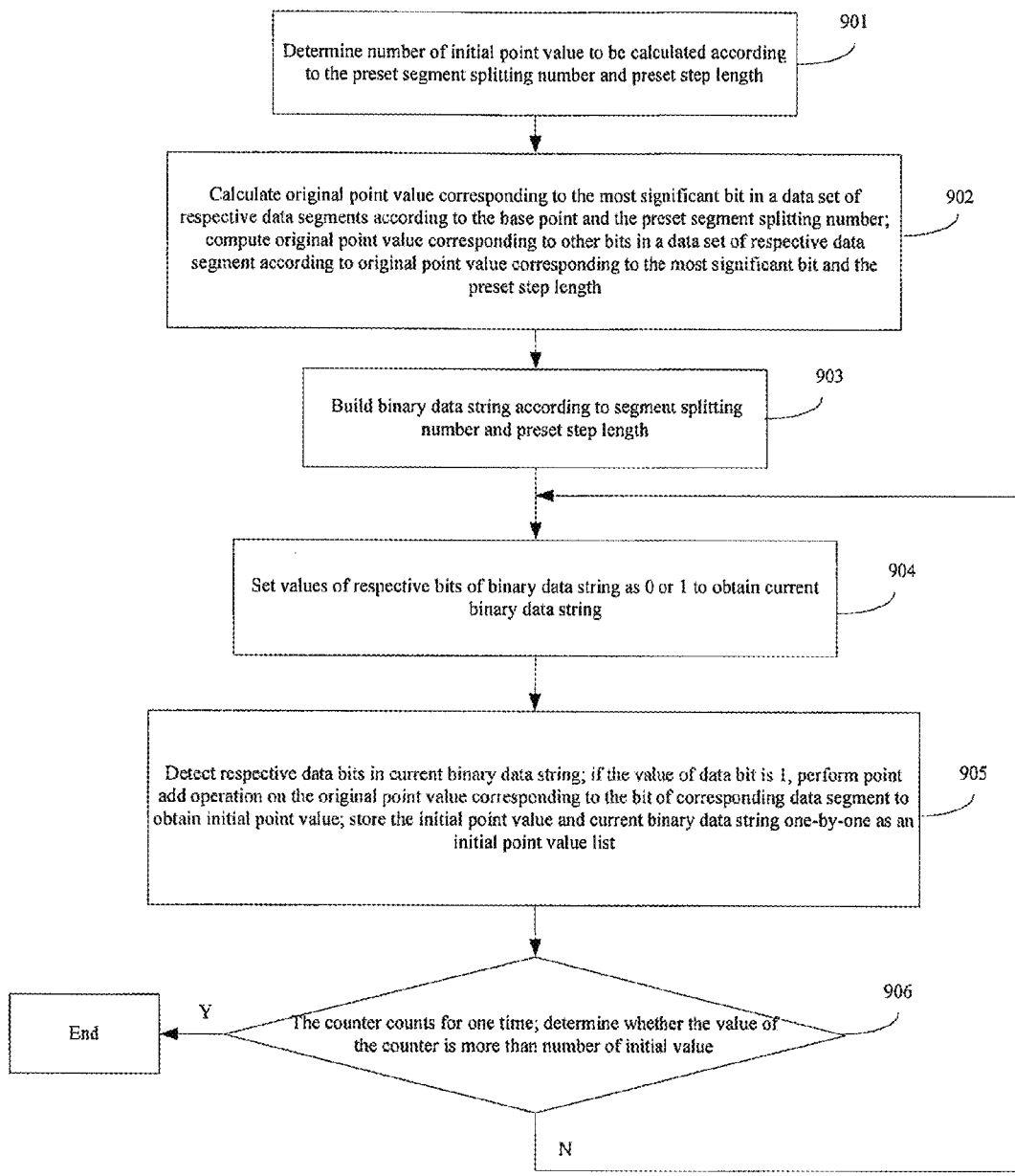
FIG. 9 is a flow chart of a method for quickly generating coordinate points in an embedded system provided by embodiment 6 of the present invention.

Embodiment 6 of the present invention provides an implementing method for calculating an initial point value in advance. For example, the preset segment splitting number is 3 and the preset step length is 1. As shown by FIG. 9, the method includes:

Step 901, determine number of initial point value to be calculated according to the preset segment splitting number and the preset step length.

Specifically, in embodiment 6, the preset segment splitting number is 3, the preset step length is 1.

Preferably, the preset step length satisfies that the data bit length of each data segment after segmenting is integral multiple of the preset step length.

In embodiment 6, for example, the value to be calculated is 101110100; the preset segment splitting number is 3; respective data segments after segmenting are a third segment 101, a second segment 110, a first segment 100; the number of original point values is obtained by calculating according to the preset segment splitting number and the preset step length; specifically, take 2 as base number, take result of a product of preset segment splitting number and preset step length minus 1 as number of original point value; In Embodiment 6, the number of original point value is $2^{3\times1}-1=7$.

For example, the value to be calculated is 110111010100; the preset segment splitting number is 2; respective data segments after segmenting are a second segment 110111, a first segment 010100; the preset step length is 3; number of original point values is $2^{2\times3}-1=63$.

Step 902, calculating original point value corresponding to the most significant bit in a data set of respective data segments according to the base point and the preset segment splitting number; computing original point value corresponding to other bits in a data set of respective data segments according to original point value corresponding to the most significant bit and the preset step length.

In embodiment 6, a method for computing the original point value of the most significant bit of respective segments according to the base point and the preset segment number has been introduced in embodiment 5; no more detail is given here.

In embodiment 6, take the most significant bit of each data set of each data segment as current bit computed for the first time; calculating the original point value corresponding to other bits in a data set of respective data segments according to the original point value and the preset step length corresponding to the most significant bit specifically includes:

Step 902-1, performing point double operation on the original point value of the current bit of each data segment so as to obtain the original point value corresponding to the current adjacent low bit and storing the original point value; add 1 to the count value of a counter.

In embodiment 6, the initial value of the counter of Step 902-1 is 0.

Step 902-2, determining whether the value of the counter overpasses the value of the preset step length, if yes, going to Step 903; otherwise, taking the adjacent low bit as a new current bit and going back to Step 902-4.

Step 903, building a binary data string according to segment splitting number and the preset step length.

In embodiment 6, Step 903 specifically includes taking a product of the segment splitting number and preset step length as bit number of binary data string.

Specifically, in embodiment 6, the preset segment splitting number is 2; the preset step length is 3; then the bit number of the binary data string is 2*3=6; preferably, in embodiment 6, the initial value of the binary data string is 000000.

Step 904, setting values of respective bits of binary data string to be 0 or 1 so as to obtain the current binary data string.

Specifically, in embodiment 6, for example, the preset segment splitting number is 2, the preset step length is 3, then the current binary data string is one of the following binary data strings: 000001, 000010, 000011, 000100, 000101, 000110, 000111, 001000, 001001, 001010, 001011, 001100, 001101, 001110, 001111, 010000, 010001, 010010, 010011, 010100, 010101, 010110, 010111, 011000, 011001, 011010, 011011, 011100, 011101, 011110, 011111; 100000, 100001, 100010, 100011, 100100, 100101, 100110, 100111, 101000, 101001, 101010, 101011, 101100, 101101, 101110, 101111, 110000, 110001, 110010, 110011, 110100, 110101, 110110, 110111, 111000, 111001, 111010, 111011, 111100, 111101, 111110, 111111.

Step 905, detecting respective data bits in the current binary data string; if the value of data bit is 1, perform point add operation on the original point value corresponding to the bit of corresponding data segment so as to obtain initial point value; storing the initial point value and current binary data string one-to-one as an initial point value list.

For example, the binary data string is 011001; then perform point add operation on the least significant bit and the second least significant bit of a data segment of a second segment; perform point add operation on a result of the point add operation and the original point value corresponding to the least significant bit of the first segment; then store the result of the result of the operation and the binary data string 011011 correspondingly.

In embodiment 6, convert the binary data string into decimal data so as to obtain a sequence number; then storing the sequence number and corresponding initial point value correspondingly.

Step 906, the counter counting for one time; determine whether the value of the counter is greater than number of the initial point values, if yes, ending operation; otherwise, going back to Step 904.

Specifically, in embodiment 6, the initial value of the counter is 0.

After completion of computing, combination of all values of binary data string, which is a binary data string list, and all corresponding initial point values, which is an initial value list, are obtained and can be stored. No repeating computing is required subsequently unless new computing references are used.

In computing process, firstly, segmenting and dividing the value to be calculated according to the preset segment splitting number and the preset step length so as to obtain a data set which is not 0; obtaining a corresponding initial point value from an initial value list; after performing point double operation on the initial point value, obtaining a next set of data; performing point add operation on the result of the point add operation and the initial point value corresponding to the next set of data till computing all the data sets of respective data segments is completed; specifically, implementing process is as the following:

Step D1, segmenting value to be calculated according to a preset segment splitting number; dividing each data segment into sets according to the preset step length; taking the first set of data of each data segment as the current data set.

Specifically, before Step D1, the process includes:

Step D0, determining whether data bit length of the value to be calculated is integral multiple of a product of the preset segment splitting number and the preset step length, if yes, going to Step D1; otherwise, padding 0 before the value to be calculated, then going back to Step D1.

Before Step D0, the process includes:

Step a1, generating or obtaining a random number.

Step a2, performing modular operation on the random number with a first fixed value so as to obtain a reminder; determining whether the reminder is 0, if yes, outputting error prompting information and going back to Step a1; otherwise, converting the random number into binary data so as to obtain the value to be calculated.

Step D2, detecting whether the data of the current data set of each data segment is 0, if yes, obtaining a next set of data of each data segment as current data set and going back to D2; otherwise, going to Step D3.

Specifically, in embodiment 6, the length of the value to be calculated is not integral multiple of the product of the preset segment splitting number and the preset step length; then padding 0 before the value to be calculated so as to make the length of the value to be calculated be integral multiple of the product of the preset segment splitting number and the preset step length; if the value to be calculated is 110101000011101, two segments after splitting are a second segment 000110101 and a first segment 000011101; the preset step length is 3, then the obtained data set is 110 and 011; then go to Step D3.

Step D3, obtaining a corresponding initial point value from the initial value list according to combination of current data set of the obtained each data segment and taking the initial point value as the mid-point value.

if the obtained current data set is 110,011 in embodiment 6, then the corresponding initial point value is obtained from the initial value list according to 110011.

If the sequence number and corresponding initial point value are stored in the list, the current data set is required to be combined to be a binary data string; taking the decimal data corresponding to the binary data string as the sequence number and obtaining the initial point value corresponding to the sequence number.

Step D4, determining whether a next data set of each data segment exists, if yes, going to Step D5; otherwise, taking the obtained initial point value as result coordinate value for storage; ending the operation.

Step D5, performing point double operation on the mid-point value for preset step length times; updating the result of point double operation with the result of the point double operation; taking a next data set of each data segment as a new current data set.

Preferably, the initial value of the mid-point value is 0 in embodiment 6.

In embodiment 6, if the preset step length is 3, 3 times of point double operation is required to be performed on the first initial point value; for example, if the first initial point value is P, the obtained mid-point value is 2*2*2*P.

Step D6, detecting whether data in the current data set of each data segment is 0, if yes, going to Step D8; otherwise, going to Step D7.

Step D7, obtaining corresponding initial point value from the initial value list according to combination of current data set of all data segments; performing point add operation on the mid-point value and the obtained corresponding initial point value; updating the mid-point value with the result of the point add operation; going to Step D8.

Step D8, determining whether a next data set of each data segment exists, if yes, going back to Step D5; otherwise, taking the mid-point value as result coordinate value for storage; then ending the operation.

The first fixed value, the second fixed value, the third fixed value and the base point are references determined by the predefined elliptic curve.

The described embodiments are only preferred embodiments of the invention and the embodiments are not intended to limit the invention. Any alteration or change easily obtained by those skilled in the art based on the invention should fall in the scope of protection of the invention. Therefore, the invention intends to protect what is claimed in claims.

The invention claimed is:

1. A method for securing data stored on a computer system with encryption or signature using a key pair by the steps comprising:
   storing encrypted data on the computer system, the encrypted data is accessible using the key pair, the key pair is based on coordinate points of an elliptical curve predefined by an embedded system of the computer system, the coordinate points are generated by the embedded system by the steps of
   Step S1, segmenting a numerical value to be calculated according to a preset segment splitting number/number of split segments and calculating data bit length of each data segment by the embedded system;

Step S2, dividing each data segment into sets (or groups) according to a preset step length; calculating an original point value corresponding to each bit in a set of data of each data segment according to a base point, data bit length of each data segment and the preset step length; and taking the first set of data of each data segment as a current data set by the embedded system;

Step S3, checking whether the data in the current data set of each data segment are all 0 by the embedded system, if yes, going to Step S4; otherwise, going to Step S5;

Step S4, taking a next data set of each data segment as the current data set and going back to Step S3 by the embedded system;

Step S5, checking value of each bit in the current data set of a current data segment, performing point add operation on an original point value corresponding to a bit of which the value is 1 and a mid-point value, and updating the mid-point value with the result of the point add operation by the embedded system;

Step S6, determining whether the current data sets of all data segments are processed completely by the embedded system, if yes, going to Step S8; otherwise, going to Step S7;

Step S7, taking other unprocessed data segment as new current data segment, and going back to Step S5 by the embedded system;

Step S8, determining whether a next data set of each data segment exists by the embedded system, if yes, going to Step S9; otherwise, taking the mid-point value as a result coordinate point for storage and ending the operation by the embedded system;

Step S9, performing a point double operation on the mid-point value for a number of times of the preset step length, updating the mid-point value with a result of the point double operation, and taking a next data set of each data segment as a new current data set by the embedded system; and Step S10, checking whether data in the current data set of each data segment are all 0 by the embedded system; if yes, going to Step S8; otherwise, going back to Step S5;

applying the result coordinate point to generate the key pairs or signature; and using the key pairs or signature to access the encrypted data on the computer system.

2. The method of claim 1, wherein before Step S1, the method comprises

Step S0, determining whether the data bit length of the value to be calculated is an integral multiple of product of the preset segment splitting number and the preset step length, if yes, go to Step S1; otherwise, padding 0 before the value to be calculated and going back to Step S0.

3. The method of claim 2, wherein before Step S0, the method comprises

Step a1, generating or obtaining a random number;

Step a2, performing a modular operation on the random number with a first fixed value so as to obtain a reminder, and determining whether the reminder is 0, if yes, outputting an error prompting information and going back to Step a1; otherwise, converting the random number into a binary number so as to obtain the value to be calculated.

4. The method of claim 1, wherein in Step S2, calculating an original point value corresponding to each bit in a set of data of each data segment according to the base point, the data bit length of each data segment and the preset step length specifically comprises that Step S21 to Step S25 is a process of calculating an initial point value corresponding to the most significant bit in a data set of all data segments; while Step S26 to Step S28 is a process of calculating original point values corresponding to other bits except for the most significant bit in a data set of each data segment; in which Step S21, numbering each of split data segments in order from small to big according to the sequence from low bit to high bit; taking the base point as the original point value corresponding to the most significant bit in a set of data set of the data segment with the minimum number; and taking the data segment with the minimum number as a current data segment;

Step S22, performing a point double operation on the original point value corresponding to the most significant bit in a set of data set of the current data segment; a first counting number adding 1 to itself; the initial value of the first counting number is 0, and the initial value of a mid-value is 0;

Step S23, determining whether the first counting number is greater than the data bit length of each data segment, if yes, going to Step S25; otherwise, going to Step S24;

Step S24, updating the mid-value with the result of the point double operation; performing a point double operation on the mid-value; the first counting number adding 1 to itself, and then going back to Step S23;

Step S25, determining whether the original point values corresponding the most significant bit in a data set of all the data segments are calculated completely, if yes, go to Step S26; otherwise, taking a next data segment as new current data segment, and taking the result of the point double operation as the initial point value corresponding to the most significant bit in a data set of the current data segment, then going back to Step S22;

Step S26, taking the most significant bit in a data set of the current data segment as a current bit; and the initial value of a second counting number is 0;

Step S27, performing a point double operation on the initial value corresponding to the current bit; the second counting number adding 1 to itself; determining whether the second count number is greater than a preset step length, if yes, going to Step S29; otherwise going to Step S28;

Step S28, taking a next bit as a new current bit, and performing a result of the point double operation as the original point value corresponding to the new current bit; then going back to Step S27; and Step S29, determining whether the initial point values corresponding to each bit in a data set of all data segments have been computed completely, if yes, going to Step S3; otherwise, taking a next data segment as the current data segment, and then going back to Step S26.

5. The method of claim 4, wherein between Step S3 and Step S5, the method comprises Step A1:

Step A1, searching for a corresponding initial point value in an initial value list according to a combination of current data set of all data segments, if the initial point value is found, obtaining the corresponding initial point value, and performing a point add operation on the initial point value and the mid-point value, updating the mid-point value with a result of the point add operation, and going to Step S8; while if the initial point value is not found, going to Step S5;

between Step S6 and Step S8, the method comprises taking the result of point add operation as the initial point value, and correspondingly storing the initial point value and the combination of current data sets of all data segments in the initial value list;

if the determination result in Step S10 is no, going back to Step A1.

6. The method of claim 5, wherein searching for a corresponding initial point value in an initial value list according to a combination of current data set of all data segments specifically comprises combining current data sets of each data segment according to the numbers from big to small so as to obtain a binary data string; and searching for corresponding initial point value in the initial value list according to the binary data string.

7. The method of claim 6, wherein searching corresponding initial point value in the initial value list according to the binary data string specifically comprises converting the binary data string into decimal data, and searching for the corresponding initial point value in the initial value list according to the sequence number.

8. A method for securing data stored on a computer system with encryption or signature using a key pair by the steps comprising:

storing encrypted data on the computer system, the encrypted data is accessible using the key pair, the key pair is based on coordinate points of an elliptical curve predefined by an embedded system of the computer system, the coordinate points are generated by the embedded system by the steps of Step s1, determining the number of initial point values to be calculated according to a preset segment splitting number and a preset step length by the embedded system;

Step s2, calculating an initial point value corresponding to the most significant bit of each data segment respectively by the embedded system according to a base point and the preset segment splitting number; and taking the most significant bit of each data segment as a current bit by the embedded system;

Step s3, performing a point double operation on the original point value of the current bit of respective data segments so as to obtain an original point value of a current adjacent low bit for storage by the embedded system; and a first count value adding 1 to itself;

Step s4, determining whether the first counting number value overpasses a value of the preset step length by the embedded system, if yes, going to Step s5; otherwise, taking the adjacent low bit as a new current bit, then going back to Step s3;

Step s5, building a binary data string according to the preset segment splitting number and the preset step length by the embedded system;

Step s6, setting respective data bits of the binary data string as 0 or 1 so as to obtain a current binary data string by the embedded system;

Step s7, checking respective data bits in the current binary data string respectively by the embedded system, performing a point add operation on the corresponding original point value in corresponding data segment of the data bit of which the value is 1 so as to obtain the initial point value by the embedded system; storing the initial point value and the current binary data string in one-one corresponding way so as to form an initial value list; and a second counting number value adding 1 to itself by the embedded system;

Step s8, determining whether the second counting number value is greater than the number of the initial point values by the embedded system; if yes, going to Step s9; otherwise, going back to Step s6;

Step s9, dividing the value to be calculated into segments according to the preset segment splitting number by the embedded system; dividing each data segment into sets according to the preset step length, and taking a first set of data of each data segment as a current data set by the embedded system;

Step s10, checking whether the data in the current data set in each data segment is 0 by the embedded system, if yes, going to Step s11; otherwise, going to Step s12;

Step s11, taking a next data set of each data segment as the current data set by the embedded system, and going back to Step S10;

Step s12, taking a corresponding initial point value as a mid-point value from the initial value list according to a combination of the current data set of each data segment by the embedded system; determining whether a next data set of each respective data segment exists by the embedded system, if yes, going to Step s13; otherwise, taking the obtained initial point value as a result coordinate point value for storage by the embedded system; then ending operation by the embedded system;

Step s13, performing a point double operation on the mid-point value for a number of times of the preset step length by the embedded system, updating the mid-point value with the result of the point double operation by the embedded system, and taking a next data set of each data segment as a new current data set by the embedded system;

Step s14, checking whether data in the current data set of each data segment is 0 by the embedded system, if yes, going to Step s16; otherwise, going to Step s15;

Step s15, obtaining corresponding initial point value from the initial value list according to a combination of the current data set of all data segments by the embedded system; performing a point add operation on the mid-point value and the obtained corresponding initial point by the embedded system; updating the mid-point value with the result of the point add operation by the embedded system, and going to Step s16; and Step s16, determining whether a next data set of each data segment exists by the embedded system, if yes, going back to Step s13; otherwise, taking the mid-point value as the coordinate point value for storage by the embedded system; then ending operation;

applying the result coordinate point to generate the key pairs or signature; and using the key pairs or signature to access the encrypted data on the computer system.

9. The method of claim 8, wherein Step s1 specifically comprises taking a result of subtracting 1 from product of the preset segment splitting number and the preset step length as a number of initial point values.

10. The method of claim 9, wherein Step s5 specifically comprises converting the product of the preset segment splitting number and the preset step length into a binary data so as to obtain the binary data string.

11. The method of claim 10, wherein before Step s9, the method comprises

Step s9', determining whether the data bit length of the value to be calculated is an integral multiple of product of the preset segment splitting number and the preset step length; if yes, going to Step s9; otherwise, padding 0 before the value to be calculated and going back to Step s9'.

12. The method of claim 11, wherein before the Step s9', the method comprises

Step a1, generating or obtaining a random number;

Step a2, performing a modular operation on the random number with a first fixed value so as to obtain a reminder, and determining whether the reminder is 0, if yes, outputting an error prompting information and going back to Step a1; otherwise converting the random number into a binary data so as to obtain the value to be calculated.

13. The method of claim 12, wherein in Step s7, storing the initial point value and the current binary data string in one-one corresponding way to form a initial value list specifically comprises converting the current binary data string into a decimal data so as to obtain a sequence number, and storing the initial point value and the corresponding sequence number as the initial value list; and in Step s15, obtaining a corresponding initial point value from the initial value list according to a combination of the current data set of each data segment specifically comprises calculating the sequence number according to the current data sets of all data segments, and obtaining the corresponding initial point value from the initial value list according to the sequence number.

14. The method of claim 13, wherein calculating the sequence number according to the current data seta of all data segments specifically comprises combining the current data sets of all data segments orderly, and converting the combined binary data into a decimal data so as to obtain the sequence number.

15. The method of claim 8, wherein in Step s2, calculating the original point value of the most significant bit of each data segment respectively according to the base point and the preset segment splitting number specifically comprises Step s21, numbering each split data segment in order from small to big according to the sequence from low bit to high bit; taking the base point as the original point value corresponding to the most significant bit in a set of data set of the data segment with the minimum number; and taking the data segment with the minimum number as a current data segment;

Step s22, performing a point double operation on the original point value corresponding to the most significant bit in a set of data set of the current data segment; a first counting number adding 1 to itself; the initial value of the first counting number is 0, and the initial value of a mid-value is 0;

Step s23, determining whether the first counting number is greater than the data bit length of each data segment, if yes, going to Step s25; otherwise, going to Step s24;

Step s24, updating the mid-value with the result of the point double operation; performing a point double operation on the mid-value; the first counting number adding 1 to itself, and going back to Step s23; and Step S25, determining whether the original point values corresponding the most significant bit in a data set of all the data segments have been computed completely, if yes, go to Step s26; otherwise, taking a next data segment as a new current data segment, and taking the result of a point double operation as the initial point value corresponding to the most significant bit in a data set of the current data segment, then going back to Step s22.

* * * * *